(12) United States Patent
Schulhauser et al.

(10) Patent No.: US 12,508,425 B2
(45) Date of Patent: Dec. 30, 2025

(54) BILATERAL VAGUS NERVE STIMULATION

(71) Applicant: Covidien LP, Mansfield, MA (US)

(72) Inventors: Randal C. Schulhauser, Phoenix, AZ (US); Richard J. O'Brien, Hugo, MN (US); Scott R. Stanslaski, Shoreview, MN (US); Mark P. Ashby, Laguna Niguel, CA (US); Avram Scheiner, Vadnais Heights, MN (US); Becky L. Dolan, Chisago, MN (US); William Valls, Jr., Chandler, AZ (US); David J. Miller, Austin, TX (US); Varun Umesh Kashyap, Irvine, CA (US); Peter N. Braido, Linwood, MN (US); Lilian Kornet, Eijsden (NL)

(73) Assignee: Covidien LP, Mansfield, MA (US)

( * ) Notice: Subject to any disclaimer, the term of this patent is extended or adjusted under 35 U.S.C. 154(b) by 463 days.

(21) Appl. No.: 18/050,751

(22) Filed: Oct. 28, 2022

(65) Prior Publication Data
US 2024/0139512 A1 May 2, 2024

(51) Int. Cl.
A61N 1/36 (2006.01)
A61N 1/05 (2006.01)

(52) U.S. Cl.
CPC ....... A61N 1/36053 (2013.01); A61N 1/0558 (2013.01); A61N 1/36135 (2013.01)

(58) Field of Classification Search
None
See application file for complete search history.

(56) References Cited

U.S. PATENT DOCUMENTS 7,711,421 B2 5/2010 Shafer et al.
7,912,537 B2 3/2011 Lee et al.
(Continued)

FOREIGN PATENT DOCUMENTS

WO 2020120999 A1 6/2020
WO 2021094789 A1 5/2021

OTHER PUBLICATIONS

"HandTutor Rehabilitation Device—User Guide Model: HT100," MediTouch HandTutor, accessed from https://meditouch.co.il/files/SiteDownloads/technical/userguide/HandTutor%20device%20user%20guide%20-%20En%20-%20v1.pdf, accessed on Jun. 20, 2023, 12 pp.

(Continued)

Primary Examiner — William J Levicky
Assistant Examiner — Willow Grace Welch
(74) Attorney, Agent, or Firm — Shumaker & Sieffert, P.A.

(57) ABSTRACT

An example system includes a first lead configured to be positioned in or beside a left internal jugular vein (IJV) of a patient to deliver a first stimulation signal to a first vagus nerve, the first lead including one or more first segmented electrodes positioned on a distal portion of the first lead and a first anchoring mechanism; a second lead configured to be positioned in or beside a right IJV of the patient to deliver a second stimulation signal to a second vagus nerve, the second lead including one or more second segmented electrodes positioned on a distal portion of the second lead and a second anchoring mechanism; and circuitry configured to deliver electrical energy to the first lead to deliver the first stimulation signal and the second lead to deliver the second stimulation signal to provide bilateral stimulation to the first vagus nerve and the second vagus nerve.

10 Claims, 13 Drawing Sheets

(56) References Cited

U.S. PATENT DOCUMENTS

| | | | |
|---|---|---|---|
| 8,000,794 B2 | 8/2011 | Lozano | |
| 8,190,251 B2 | 5/2012 | Molnar et al. | |
| 8,504,161 B1* | 8/2013 | Kornet | A61N 1/36139 607/2 |
| 8,594,779 B2 | 11/2013 | Denison et al. | |
| 8,620,450 B2 | 12/2013 | Tockman et al. | |
| 8,738,121 B2 | 5/2014 | Virag et al. | |
| 8,818,508 B2 | 8/2014 | Scheiner | |
| 8,818,524 B2 | 8/2014 | Hincapie Ordonez et al. | |
| 8,849,392 B2 | 9/2014 | Lozano | |
| 8,972,015 B2 | 3/2015 | Stack et al. | |
| 9,302,111 B2 | 4/2016 | John et al. | |
| 9,326,720 B2 | 5/2016 | Mclaughlin | |
| 9,333,355 B2 | 5/2016 | Kilgard et al. | |
| 9,357,941 B2 | 6/2016 | Simon | |
| 9,421,373 B2 | 8/2016 | Dilorenzo | |
| 9,572,982 B2 | 2/2017 | Burnes et al. | |
| 9,597,032 B2 | 3/2017 | Sun et al. | |
| 9,603,522 B2 | 3/2017 | Lee et al. | |
| 9,855,431 B2 | 1/2018 | Ternes et al. | |
| 10,188,353 B2 | 1/2019 | Stolen et al. | |
| 10,238,862 B2 | 3/2019 | Cook et al. | |
| 10,537,728 B2 | 1/2020 | Simon et al. | |
| 10,758,722 B2 | 9/2020 | Gross et al. | |
| 10,779,747 B2 | 9/2020 | Simon | |
| 10,820,819 B2 | 11/2020 | Afshar et al. | |
| 10,874,300 B2 | 12/2020 | Hahn et al. | |
| 11,006,841 B2 | 5/2021 | Wainwright et al. | |
| 11,167,127 B2 | 11/2021 | Scheiner et al. | |
| 11,167,140 B2 | 11/2021 | Scheiner et al. | |
| 11,298,538 B2 | 4/2022 | Huertas Fernandez et al. | |
| 11,589,785 B2 | 2/2023 | Probst et al. | |
| 2007/0260284 A1* | 11/2007 | Pastore | A61N 1/36114 607/9 |
| 2007/0276439 A1 | 11/2007 | Miesel et al. | |
| 2008/0183097 A1 | 7/2008 | Leyde et al. | |
| 2009/0276025 A1* | 11/2009 | Burnes | A61N 1/36085 607/116 |
| 2010/0010556 A1* | 1/2010 | Zhao | A61N 1/36592 607/9 |
| 2010/0023088 A1* | 1/2010 | Stack | A61N 1/36114 601/2 |
| 2011/0190857 A1* | 8/2011 | Gerber | A61N 1/37518 607/116 |
| 2013/0013045 A1* | 1/2013 | Soltis | A61N 1/0558 607/118 |
| 2013/0274845 A1* | 10/2013 | Kokones | A61N 1/0558 607/117 |
| 2017/0071495 A1 | 3/2017 | Denison et al. | |
| 2019/0110754 A1 | 4/2019 | Rao et al. | |
| 2019/0247664 A1* | 8/2019 | Irazoqui | A61B 5/01 |
| 2021/0030299 A1 | 2/2021 | Naber et al. | |
| 2021/0113099 A1 | 4/2021 | Rogers et al. | |
| 2021/0196182 A1 | 7/2021 | D'arcy et al. | |
| 2021/0251497 A1 | 8/2021 | Schulhauser et al. | |
| 2021/0251525 A1 | 8/2021 | Probst et al. | |
| 2021/0251578 A1 | 8/2021 | Schulhauser et al. | |
| 2021/0290178 A1 | 9/2021 | Kolls et al. | |
| 2022/0061743 A1 | 3/2022 | Christensen et al. | |
| 2022/0183633 A1 | 6/2022 | Kinzie et al. | |

OTHER PUBLICATIONS

"Homepage—Introducing the Vivistim System," Vivistim, accessed from https://www.vivistim.com/, accessed on Jun. 16, 2023, 3 pp.

"Positive Stroke Rehabilitation Clinical Trail Results for the Vivistim Paired with VNS System Published in The Lancet", Micro Transponder, Inc., The Lancet, Apr. 22, 2021, 5 pp.

"Stroke Rehabilitation—The Vivistim Paired VNS System," MicroTransponder, accessed from https://microtransponder.com/en-gb/stroke/physicians/stroke-technology, accessed on Jun. 16, 2023, 1 pp.

"Vivistim System—Product Manual 2021", MicroTransponder, Inc., 2021, 56 pp., (Applicant points out, in accordance with MPEP 609.04(a), that the year of publication, 2021, is sufficiently earlier than the effective U.S. filing date, so that the particular month of publication is not an issue.).

"Wearable Healthcare Technology & Devices for Stroke Recovery", MC10, https://www.mc10inc.com/, 2021, 7 pp., (Applicant points out, in accordance with MPEP 609.04(a), that the year of publication, 2021, is sufficiently earlier than the effective U.S. filing date, so that the particular month of publication is not an issue.).

Adans-Dester et al., "Enabling precision rehabilitation interventions using wearable sensors and machine learning to track motor recovery", NPJ Digital Medicine, vol. 3, No. 121, Sep. 21, 2020, 10 pp., doi.org/10.1038/s41746-020-00328-w.

Anastasi et al., "Brain Symmetry Index in Healthy and Stroke Patients for Assessment and Prognosis", Stroke Research and Treatment, vol. 2017, No. 8276136, Hindawi Publishing Corporation, Jan. 30, 2017, 9 pp., http://dx.doi.org/10.1155/2017/8276136.

Arimura et al., "Intravenous electrical vagal nerve stimulation prior to coronary reperfusion in a canine ischemia-reperfusion model markedly reduces infarct size and prevents subsequent heart failure", International Journal of Cardiology, vol. 227, Elsevier, Oct. 29, 2016, pp. 704-710.

Bernstein et al., "Effect of Long-term Continuous Cardiac Monitoring vs Usual Care on Detection of Atrial Fibrillation in Patients with Stroke Attributed to Large- or Small-Vessel Disease", JAMA, vol. 325, No. 21, Jun. 1, 2021, pp. 2169-2177, doi:10.1001/jama. 2021.6470.

Bianchi et al., "Increase of Ventricular Interval During Atrial Fibrillation by Atrioventricular Node Vagal Stimulation—Chronic Clinical Atrioventricular-Nodal Stimulation Download Study", Circulation: Arrhythmia and Electrophysiology, vol. 8, No. 3, Jun. 2015, pp. 562-568, Doi:10.1161/CIRCEP.114.002588.

Bonaz et al., "Anti-inflmmatory properties of the vagus nerve: potential therapeutic implications of vagus nerve stimulation", The Journal of Physiology, vol. 594, No. 20, The Physiological Society, Oct. 15, 2016, pp. 5781-5790, Doi: 10.1113/JP271539.

Boukhennoufa et al., "Wearable sensors and machine learning in post-stroke rehabilitation assessment: A systematic review", Biomedical Signal Processing and Control, vol. 71, No. 103197, Elsevier, Oct. 13, 2021, 16 pp., https://doi.org/10.1016/j.bspc.2021. 103197.

Brambrilla et al., "Combined Use of EMG and EEG Techniques for Neuromotor Assessment in Rehabilitative Applications: A Systemic Review", Sensors, vol. 21, No. 7014, MDPI, Oct. 22, 2021, 25 pp., doi.org/10.3390/s21217014.

Bronk et al., "Novel Electrode Placement in Electrical Bioimpedance-Based Stroke Detection: Effects on Current Penetration and Injury Characterization in a Finite Element Model", IEEE Transactions on Biomedical Engineering, vol. 69, No. 5, PMC, May 2022, pp. 1475-1757, doi:10.1109/TBME.2021.3129734.

Chang et al., "EEG analysis of mixed-reality music rehabilitation system for post-stroke lower limb therapy", [Abstract only], Society for Information Display (SID), May 19, 2019, 1 pp., https://doi.org/10.1002/jsid.787.

Chen et al., "Hype or hope: Vagus nerve stimulation argainst acute myocardial ischemia-reperfusion injury", Trends in Cardiovascular Medicine, vol. 30, No. 8, Elsevier, Nov. 2020, pp. 481-488, https://doi.org/10.1016/j.tcm.2019.10.011.

Chen et al., "Principles of Electrophysiological Assessments for Movement Disorders", Journal of Movement Disorders, vol. 13, No. 1, The Korean Movement Disorder Society, Oct. 21, 2019, pp. 27-38, https://doi.org/10.14802/jmd.19064.

Chung et al., "Mediation of Cardiac Macrophage Activity via Auricular Vagal Nerve Stimulation Ameliorates Cardiac Ischemia/Reperfusion Injury", Frontiers in Neuroscience, vol. 14, No. 906, PMC, Sep. 9, 2020, p. 13 p., doi: 10.3389/fnins.2020.00906.

Cramer et al., "Treatments to Promote Neural Repair after Stroke", Journal of Stroke, vol. 20, No. 1, Jan. 18, 2018, pp. 57-70, doi.org/10.5853/jos.2017.02796.

Cramer, "Vagus nerve stimulation during stroke rehab boots arm mobility", UCLA Health Newsroom, The Lancet, Apr. 29, 2021, 4 pp.

(56) References Cited

OTHER PUBLICATIONS

Dawson et al., "Vagus Nerve Stimulation Paired with Rehabilitation for Upper Limb Motor Function After Ischaemic Stroke (VNS-Rehab): A Randomised, Blinded, Pivotal, Device Trial", Lancet, vol. 397, No. 10284, PMC, Apr. 24, 2021, pp. 1545-1553, Doi:10.1016/S0140-6736(21)00475-X.

Engineer et al., "Targeted Vagus Nerve Stimulation for Rehabilitation After Stroke", Frontiers in Neuroscience, vol. 13, No. 280, Mar. 19, 2019, 18 pp., doi: 10.3389/fnins.2019.00280.

Fan et al., "Low Amplitude Vagus Nerve Stimulation Affects Heart Rate and Neurohormones in Humans", JACC, vol. 55, No. 10A, Atlanta, Georgia, Mar. 15, 2010, 1 pp.

Fan et al., "Low-amplitude Vagus Nerve Stimulation Transiently Affects Heart Rate and Blood Pressure in Awake Humans", HRS, Medtronic, 2010, 1 pp., (Applicant points out, in accordance with MPEP 609.04(a), that the year of publication, 2010, is sufficiently earlier than the effective U.S. filing date, so that the particular month of publication is not an issue.).

Fan et al., "Transvenous Vagus Nerve Stimulation: A Potential Heart Failure Therapy is Feasible in Humans", JACC, vol. 55, No. 10A, Atlanta, Georgia, Mar. 15, 2010, 1 pp.

Finnigan et al., "EEG in ischaemic stroke: Quantitative EEG can uniquely inform (sub-)acute prognoses and clinical management", Clinical Neurophysiology, vol. 124, Elsevier, Jan. 2013, pp. 10-19, http://dx.doi.org/10.1016/j.clinph.2012.07.003.

Fontenot et al., "FDA Approves Stroke Rehabilitation Therapy Created at UT Dallas", The University of Texas at Dallas News Center, Sep. 10, 2021, 5 pp., accessed on Jun. 16, 2023.

George et al., "Novel Stroke Rehab Treatment Wins FDA Approval—Neurostim system approved for upper limb deficits", MedPage Today, Aug. 27, 2021, 5 pp., accessed Jun. 16, 2023.

Giaquinto et al., "EEG Recordings in the Course of Recovery from Stroke", Stroke, vol. 25, No. 11, Nov. 1994, pp. 2204-2209.

Haque et al., "Illuminating the dark spaces of healthcare with ambient intelligence", Nature, vol. 585, Sep. 9, 2020, pp. 193-202, https://doi.org/10.1038/s41586-020-2669-y.

Heimrich et al., "Heart Rate Variability Analyses in Parkinson's Disease: A Systemic Review and Meta-Analysis", Brain Sciences, vol. 11, No. 8, MDPI, Jul. 21, 2021, 12 pp., https://doi.org/10.3390/brainsci11080959.

Hohnloser et al., "Prophylactic Use of an Implantable Cardioverter-Defibrillator after Acute Myocardial Infarction", The New England Journal of Medicine, vol. 351, No. 24, NIH, Dec. 9, 2004, pp. 2481-2488.

Jackson et al., "Characteristics of Waveform Shape in Parkinson's Disease Detected with Scalp Electroencephalography", eNeuro, vol. 6, No. 3, May 27, 2019, pp. e0151-19.2019 1-11, https://doi.org/10.1523/ENEURO.0151-19.2019.

Jayaraman et al., "MC10 Inpatient Stroke Recovery", Ability Lab Foundation, 2021, 6 pp., (Applicant points out, in accordance with MPEP 609.04(a), that the year of publication, 2021, is sufficiently earlier than the effective U.S. filing date, so that the particular month of publication is not an issue.).

Jayaraman et al., "Wearable Sensor Platform to Monitor Stroke Recovery", Ability Lab Research Foundation, 2021, 4 pp., (Applicant points out, in accordance with MPEP 609.04(a), that the year of publication, 2021, is sufficiently earlier than the effective U.S. filing date, so that the particular month of publication is not an issue.).

Katzan et al., "Physical Activity Monitoring Using a Fitbit Device in Ischemic Stroke Patients: Prospective Cohort Feasibility Study", JMIR MHealth and UHealth, vol. 9, No. 1, Jan. 19, 2021, 14 pp., doi: 10.2196/14494.

Ko et al., "Integrated Gait Triggered Mixed Reality and Neurophysiological Monitoring as a Framework for Next-Generation Amulatory Stroke Rehabilitation", IEEE Transactions on Neural Systems and Rehabilitation Engineering, vol. 29, EMB, Nov. 8, 2021, pp. 2435-2444, DOI: 10.1109/TNSRE.2021.3125946.

Koopman et al., "Vagus nerve stimulation inhibits cytokine production and attenuates disease severity in rheumatoid arthritis", Proc Natl Acad Sci U S A., vol. 113, No. 29, PMC, Jul. 19, 2016, pp. 8284-8289, doi: 10.1073/pnas.1605635113.

Kox et al., "Transvenous vagus nerve stimulation does not modulate the innate response during experimental human endotoxemia: a randomized controlled study", Arthritis Research & Therapy, vol. 17, No. 150, BioMed Central, Sep. 11, 2013, 9 pp., DOI 10.1186/s13075-015-0667-5.

Kumar et al., "Motor recovery monitoring in post acute stroke patients using wireless accelerometer and cross-correlation", 2013 35th Annual International Conference of the IEEE Engineering in Medicine and Biology Society (EMBC), Jul. 3, 2013, 4 pp., DOI:10.1109/EMBC.2013.6611094.

Lerman et al., "Noninvasive Transcutaneous Vagus Nerve Stimulation Decreases Whole Blood Culture-Derived Cytokines and Chemokines: A Randomized, Blinded, Healthy Control Pilot Trial", Neuromodulation, vol. 19, Wiley, Dec. 17, 2015, pp. 283-291, DOI: 10.1111/ner.12398.

Linq-Ii et al., "Stroke Patient Brochure", Medtronic, 2021, 16 pp., (Applicant points out, in accordance with MPEP 609.04(a), that the year of publication, 2021, is sufficiently earlier than the effective U.S. filing date, so that the particular month of publication is not an issue.).

Mahadevan et al., "Development of digital biomarkers for resting tremor and bradykinesia using a wrist-work wearable device", npj Digital Medicine, vol. 3, No. 5, Jan. 15, 2020, 12 pp., https://doi.org/10.1038/s41746-019-0217-7.

Mahoney Fi, Barthel D. et al., ""Functional evaluation: the Barthel Index"", Maryland State Med Journal, vol. 14, Stroke Center, 1965, pp. 56-61, (Applicant points out, in accordance with MPEP 609.04(a), that the year of publication, 1965, is sufficiently earlier than the effective U.S. filing date, so that the particular month of publication is not an issue.) Used with permission.

McDowell et al., "Sleep Dysfunction and EEG Alterations in Mice Overexpressing Alpha-Synuclein", Journal of Parkinson's Disease, vol. 4, No. 3, IOS Press, Jan. 18, 2018, pp. 531-539, DOI 10.3233/JPD-140374.

Monge-Pereira et al., "Electroencephalography as a post-stroke assessment method: An updated review", Neurologia, vol. 32, No. 1, CrossMark, Oct. 2014, 10 pp., DOI: 10.1016/j.nrleng.2014.07.004.

Ohry et al., "Correlation Between Music Therapist's and Stroke Patient's Engagement Levels and Patient's Fingers and Wrist Movement", Clinicaltrails.gov, Aug. 18, 2021, 7 pp., accessed from https://classic.clinicaltrials.gov/ct2/show/NCT05011448.

Rossi et al., "Epicardial ganglionated plexus stimulation decreases postoperative inflammatory response in humans", Heart Rhythm, vol. 9, No. 6, Science Direct, Jun. 2012, pp. 943-950.

Salarian et al., "Quantification of Tremor and Bradykinesia in Parkinson's Disease Using a Novel Ambulatory Monitoring System", IEEE Transactions of Biomedical Engineering, vol. 54, No. 2, Feb. 2007, pp. 313-322, DOI: 10.1109/TBME.2006.886670.

Sanna et al., "Cryptogenic Stroke and Underlying Atrial Fibrillation", The New England Journal of Medicine, vol. 370, No. 26, Massachusetts Medical Society, Jun. 26, 2014, pp. 2478-2486, DOI: 10.1056/NEJMoa1313600.

Sebastian-Romagosa et al., "EEG Biomarkers Related With the Functional State of Stroke Patients", Frontiers in Neuroscience, vol. 14, No. 582, Jul. 7, 2020, 16 pp., doi: 10.3389/fnins.2020.00582.

Sebastian-Romagosa et al., "Laterality Coefficient: An EEG parameter related with the functional improvement in stroke patients", 2019 IEEE EMBS International Conference on Biomedical & Health Informatics (BHI), Chicago, Illinois, Sep. 12, 2019, pp. 1-4, doi: 10.1109/BHI.2019.8834472.

Shaban et al., "Resting-state electroencephalography based deep-learning for the detection of Parkinson's disease", PLoS One, vol. 17, No. 2, e0263159, Feb. 24, 2022, 23 pp., https://doi.org/10.1371/journal.pone.0263159.

Stavrakis et al., "Low-level transcutaneous electrical vagus nerve stimulation suppresses atrial fibrillation", Journal of the American College of Cardiology, vol. 65, No. 9, PMC, Mar. 10, 2016, pp. 867-875, doi:10.1016/j.jacc.2014.12.026.

Street et al., "Home-based neurologic music therapy for upper limb rehabilitation with stroke patients at community rehabilitation stage—a

(56) References Cited

OTHER PUBLICATIONS feasibility study protocol", Frontiers in Human Neuroscience, vol. 9, No. 480, Sep. 2015, 16 pp., doi: 10.3389/fnhum.2015.00480.

Taylor-Piliae et al., "Objective fall risk detection in stroke survivors using wearable sensor technology: a feasibility study", Topics in Stroke Rehabilitation, vol. 23, No. 6, Taylor & Francis Group, Mar. 15, 2016, pp. 393-399, DOI 10.1179/1074935715Z.00000000059.

Tracey et al., "The inflammatory reflex", Nature, vol. 420, Nature Publishing Group, Dec. 2002, pp. 853-859.

Uitterdijk et al., "Vagal nerve stimulation started just prior to reperfusion limits infarct size and no-reflow", Basic Research in Cardiology, vol. 110, No. 51, PMC, Aug. 26, 2015, 14 pp., DOI 10.1007/s00395-015-0508-3.

Wang et al., "Chronic Intermittant Low-Level Transcutaneous Electrical Stimulation of Auricular Branch of Vagus Nerve Improves Left Ventricular Remodeling in Conscious Dogs With Healed Myocardial Infarction", Circulation: Heart Failure, vol. 7, No. 6, American Heart Association, Nov. 2014, pp. 1014-1021, https://doi.org/10.1161/CIRCHEARTFAILURE.114.001564.

Zamotrinsky et al., "Vagal neurostimulation in patients with coronary artery disease", Autonomic Neuroscience: Basic & Clinical, vol. 88, Elsevier, Jan. 17, 2001, pp. 109-116.

Zhang et al., "Subthrewshold vagal stimulation suppresses ventricular arrhythmia and inflmmatory response in a canine model of acute cardiac ischaemia and reperfusion", Experimental Physiology, vol. 101, No. 1, The Physiological Society, Jan. 2016, pp. 41-49, DOI: 10.1113/EP085518.

\* cited by examiner

BILATERAL VAGUS NERVE STIMULATION

TECHNICAL FIELD

The disclosure relates to devices and techniques for performing bilateral vagus nerve stimulation of a patient.

BACKGROUND

Neuromodulation by electrical stimulation of the cervical, thoracic, and abdominal branches of the vagus nerve has been shown to be useful for a wide range of purposes. Proposed systems for vagus stimulation include unilateral cuff electrodes and/or vascular access leads.

SUMMARY

Unilateral stimulation of a vagus nerve may lead to a refractory response due to nerve fatigue. In addition, cuff electrodes may be associated with more invasive implantation procedures and negative tissue interactions, and may preclude testing responsiveness to vagus nerve stimulation prior to finalizing positioning of the electrodes and engaging the cuff electrode to the nerve. In general, the disclosure is directed to devices, systems, and techniques for performing bilateral vagus nerve stimulation of a patient, for example, stimulating the vagus nerves of the patient from one or more electrodes respectively on two or more leads, with a first lead disposed within or beside a left internal jugular vein (IJV) of the patient and a second lead disposed within or beside a right IJV of the patient. Bilateral stimulation may allow for less frequent stimulation of any single vagus nerve. In addition, endovascular and/or percutaneous lead placement may also allow temporary trialing patients to test therapy responsiveness.

In one example, the disclosure is directed to a system comprising a first lead configured to be positioned in or beside a left internal jugular vein (IJV) of a patient to deliver a first stimulation signal to a first vagus nerve on a first side of a neck, the first lead including one or more first segmented electrodes positioned on a distal portion of the first lead and one or more first anchoring mechanisms; a second lead configured to be positioned in or beside a right IJV of the patient to deliver a second stimulation signal to a second vagus nerve on a second side of a neck, the second side being different than the first side, the second lead including one or more second segmented electrodes positioned on a distal portion of the second lead and one or more second anchoring mechanisms; and circuitry configured to be coupled to the first lead and the second lead, the circuitry being configured to deliver electrical energy to the first lead to deliver the first stimulation signal and the second lead to deliver the second stimulation signal to provide bilateral stimulation to the first vagus nerve and the second vagus nerve.

In another example, this disclosure is directed to an implantable medical device including stimulation circuitry configured to be coupled to a first lead and a second lead and configured to deliver first stimulation signals to a first vagus nerve on a first side of a neck via the first lead and deliver second stimulation signals to a second vagus nerve on a second side of the neck via the second lead; telemetry circuitry configured to be coupled to a sensor device and configured to receive physiological parameter data from the sensor device; and processing circuitry configured to cause the stimulation circuitry to adjust delivery of the first stimulation signals and the second stimulation signals based on the received physiological parameter data.

The details of one or more examples are set forth in the accompanying drawings and the description below. Other features, objects, and advantages of the disclosure will be apparent from the description and drawings, and from the claims.

The above summary is not intended to describe each illustrated example or every implementation of the present disclosure.

DETAILED DESCRIPTION

Figure 1:
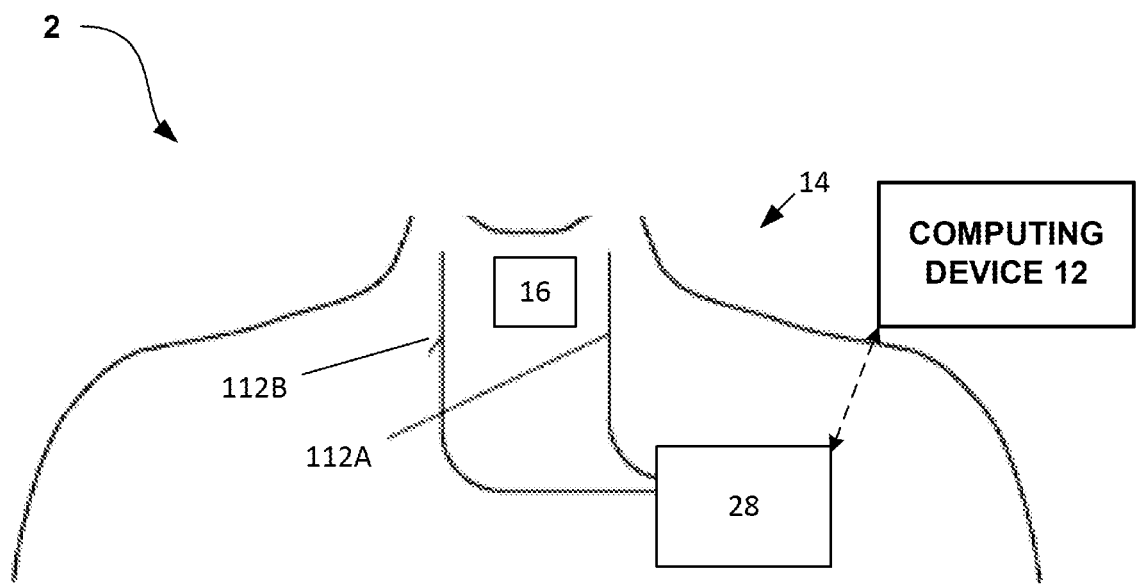
FIG. 1 depicts a conceptual diagram of an example neurostimulation system in accordance with one or more techniques of the present disclosure.

Recent discoveries relating to vagus nerve stimulation have uncovered the nervous system involvement and control of the body's inflammatory response. The nervous system senses inflammation, pathogens, and tissue damage, as well as modulates the response. Animal and human studies have shown that stimulating the vagus nerve may dampen the inflammatory response and associated cytokine response. Recent studies have shown that by varying the stimulation, inflammatory cytokines can be modulated up or down.

In addition, vagus nerve stimulation may assist in stroke rehabilitation and limit ischemia reperfusion injury. After a myocardial infarct or stroke, reperfusion therapies (surgery or drugs) are given to restore blood flow. However, due to the restoration of blood, flow induced local damage occurs, which is called ischemia reperfusion injury. This will induce local accumulations of chemical mediators such as reactive oxygen species (ROS) production, inflammatory cytokines, bradykinin, etc. Thus, the inflammatory state is worsened. The inflammatory compounds will trigger sensory signaling, which might lead to a reduced organ vagus activity and sympathetic overdrive. Vagus nerve stimulation may treat reperfusion damage as the inflammatory state may be lowered by increasing parasympathetic drive.

In general, the disclosure is directed to devices, systems, and techniques for performing bilateral vagus nerve stimulation of a patient, for example, stimulating the vagus nerves of the patient from one or more electrodes respectively on two or more leads, with a first lead disposed within or beside a left IJV of the patient and a second lead disposed within or beside a right IJV of the patient. In some examples, a first lead and/or a second lead may be positioned in a neurovascular sheath beside a respective IJV of the patient. Bilateral stimulation may allow for less frequent stimulation of any single vagus nerve, which may reduce nerve fatigue. Leads being configured to be placed endovascularly and/or percutaneously may also allow temporary trialing patients to test therapy responsiveness. In addition, closed-loop feedback techniques in a bilateral neurostimulation system or device may provide quicker, more efficient, and more responsive results than an open-loop technique. This disclosure describes examples of such devices, systems, and techniques.

A device or system configured to bilaterally stimulate the vagus nerves, as described in examples above and below, would be useful for treating a variety of illnesses including, but not limited to: reperfusion damage, cardiac ischemia, brain ischemia, stroke, traumatic brain injury, surgical or non-surgical acute kidney injury; inability of the intestine (bowel) to contract normally and move waste out of the body; postoperative ileus; postoperative cognitive decline or postoperative delirium; asthma; sepsis; bleeding control; myocardial infarction reduction; and dysmotility and obesity. Treating any of these diseases may improve patient outcomes by shortening length of hospital stays and reducing medical costs.

FIG. 1 is a conceptual diagram illustrating an example neurostimulation system 2. Neurostimulation system 2 includes an implantable medical device (IMD) 28, a first lead 112A, and a second lead 112B. First lead 112A and second lead 112B may be each include one or more electrodes (not shown in FIG. 1) and be configured to provide stimulation signal(s) to a respective vagus nerve of patient 14. In some examples, neurostimulation system 2 may provide one or more stimulation pulses, for example a single stimulation pulse, via one or more electrodes and the compound action potential may be recorded by another electrode to assess if vagus nerve stimulation takes place. In some examples, first lead 112A and second lead 112B may be coupled to IMD 28.

Neurostimulation system 2 may include sensing device 16 include or more sensors. In some examples, one or more sensors of sensing device 16 may be one or more of electromyography (EMG) sensors, e.g., electrodes, or accelerometers. One or more sensors of sensing device 16 may additionally or alternatively include one or more sensors to identify changes in electroencephalography (EEG), blood pressure, pulse, blood flow, respiration, temperature, activation of muscles not in the larynx, or any metrics indicative of vagus nerve stimulation. Sensing device 16 may be configured to detect respective features indicative of muscle activation of a patient, such as laryngeal muscle activation of a patient.

In an example in which sensors of sensing device 16 include one or more EMG sensors, EMG sensors may be configured to detect laryngeal muscle activation of a patient when first lead 112A and second lead 112B is secured on the patient. Sensing device 16 may be configured to be positioned generally over the larynx region of a patient to detect laryngeal muscle activation. In some examples, sensing device 16 may be a patch to be positioned generally over the larynx and may adhere to patient. In some examples, sensing device 16 may be held by a user to position sensing device 16 generally over the larynx. Detecting an amount of laryngeal muscle activity, above a laryngeal muscle activity threshold, may indicate activation of the laryngeal nerve, which is an indication of vagus nerve stimulation.

In an example in which sensors of sensing device 16 include one or more accelerometers, the accelerometers may be configured to monitor activation of laryngeal muscles and/or other muscles. For example, measurements by one or more accelerometers may indicate activity of laryngeal muscles above a laryngeal muscle threshold that indicates activation of muscles controlled by laryngeal nerve, which is an indication of vagus nerve stimulation. In some examples, measurements by one or more accelerometers may indicate muscle movement that do not correspond to laryngeal muscle movement, which may indicate mispositioning of first lead 112A and second lead 112B in a patient.

Computing device 12 may be configured for wireless communication with IMD 28 and/or sensing device 16. In addition, IMD 28 may be configured for wireless communication with sensing device 16. Computing device 12 may retrieve data from IMD 28 that was collected and stored by the IMD 28. In some examples, computing devices 12 may take the form of personal computing devices of patient 14. For example, computing device 12 may take the form of a smartphone of patient 14, and/or a smartwatch or other smart apparel of patient 14. In some examples, computing device 12 may be any computing device configured for wireless communication with IMD 28 such as a desktop, laptop, or tablet computer. In some examples, computing device may be a dedicated programming device for IMD 28, e.g., a clinician programmer or a patient programmer. Computing device 12 may communicate with IMD 28 according to standards or protocols, such as 3G, 4G, 5G, WiFi (e.g., 802.11 or 802.15 ZigBee), Bluetooth®, or Bluetooth® Low Energy (BLE).

Figure 2A:
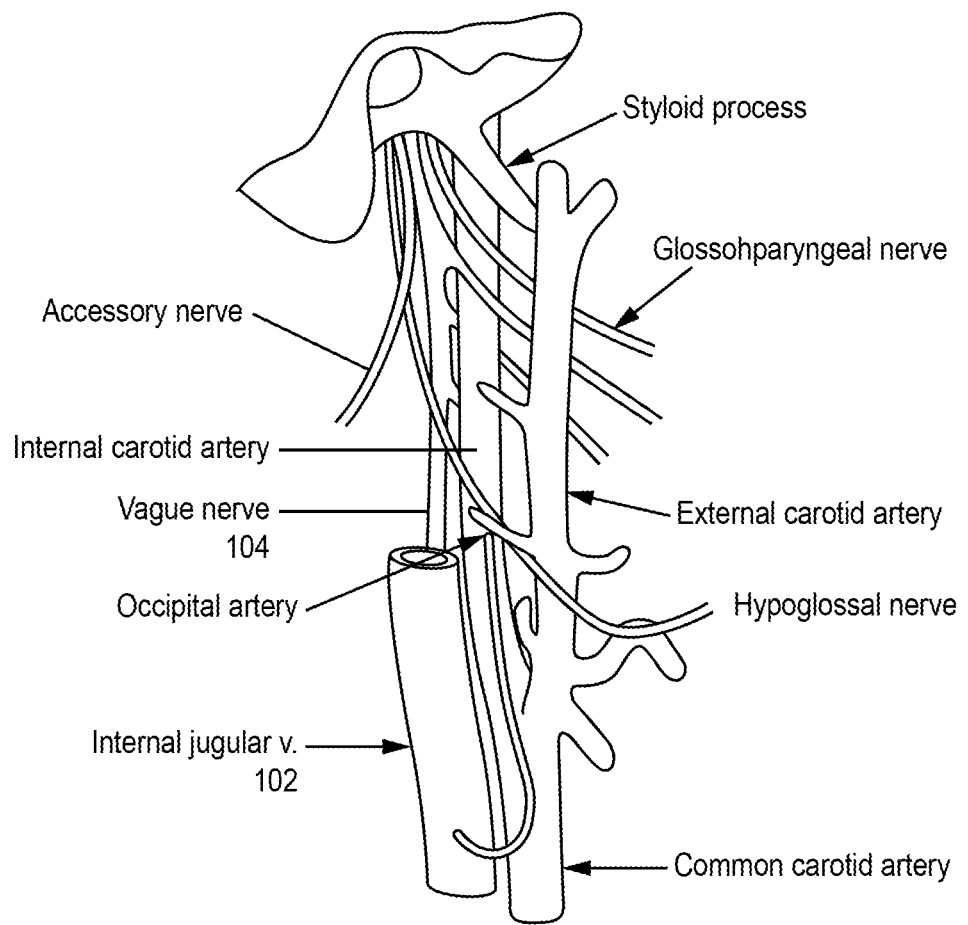
FIG. 2A depicts a conceptual diagram of an example of anatomy of a neck of a patient.
Figure 2B:
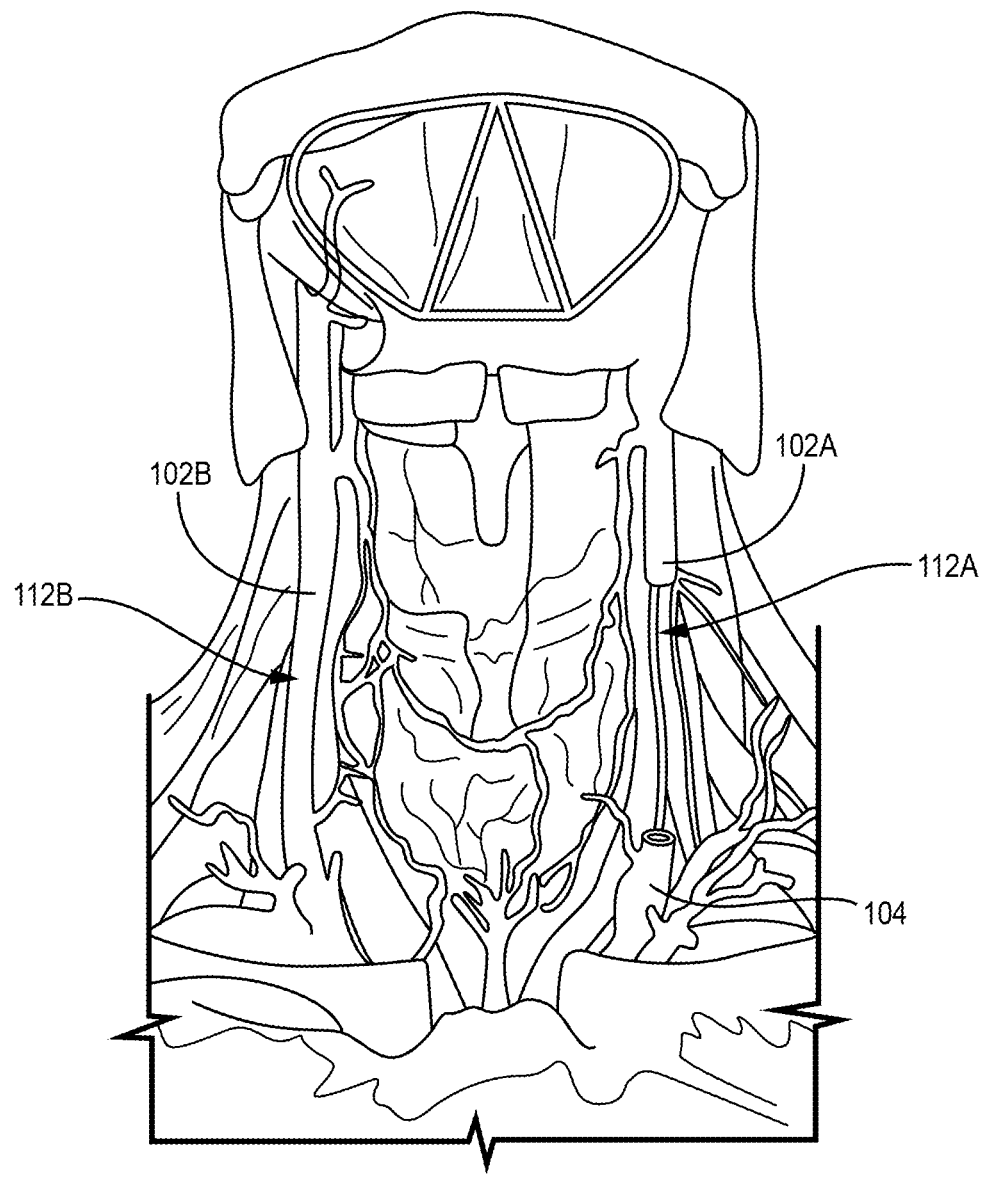
FIG. 2B depicts a conceptual diagram of an example of anatomy of a neck of a patient.

FIG. 2A is an example of a conceptual diagram of anatomy of a neck of patient 14. Patient 14 is depicted as having an IJV 102, a vagus nerve 104, and a hypoglossal nerve. FIG. 2B is an example of a detailed conceptual diagram of anatomy of a neck of patient 14. Patient 14 is depicted having a left IJV 102A, a right IJV 102B, and left vagus nerve 104A. Patient 14 also has a right vagus nerve, which is not shown if FIG. 2B, positioned on a right side of patient 14 in a similar respective position to where the left vagus nerve 104A is located on the left side. In some examples, first lead 112A and/or second 112B (FIG. 1) may be configured to be positioned endovascularly with respect to the IJV 102 and vagus nerve 104. In some examples, first lead 112A and/or second 112B may be configured to be positioned percutaneously with respect to the IJV 102 and vagus nerve 104. In some examples, one of first lead 112A, second 112B may be configured to be positioned endovascularly while the other lead may be configured to be positioned percutaneously with respect to the IJV 102 and vagus nerve 104. In some examples, first lead 112A may be configured to be positioned at 1112A and second lead 112B may be configured to be positioned at 1112B, as shown in FIG. 2B.

Figure 4:
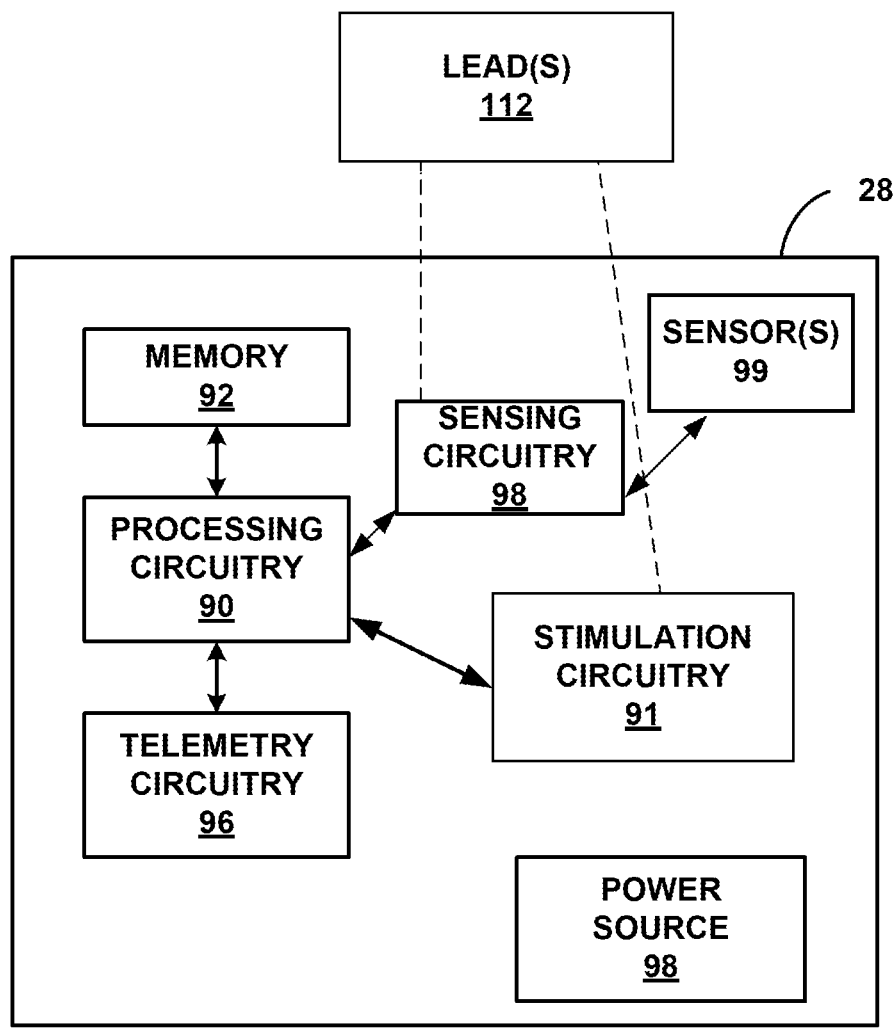
FIG. 4 depicts a schematic diagram of an example of an implantable medical device in accordance with one or more techniques of the present disclosure.

IMD 28 (FIG. 1) may be configured to deliver stimulation signal(s) to each of the left and right vagus nerve 104 (cumulatively "vagus nerves") of patient 14 via one or more electrodes in each of the first lead 112A and second lead 112B. IMD 28 may include circuitry configured to control stimulation being delivered to the vagus nerves of patient 14. For example, IMD 28 may include processing circuitry, telemetry circuitry, and memory (e.g., as shown in FIG. 4). The telemetry circuitry may be configured for wireless or wired communication. In some examples, IMD 28 may also include stimulation circuitry configured to generate stimulation signal(s).

In some examples, IMD 28 may deliver stimulation signal(s) to the vagus nerves of patient 14 via first lead 112A and second lead 112B positioned within a respective IJV 102 of patient 14. In some examples, IMD 28 may deliver stimulation signal(s) to the vagus nerves of patient 14 via first lead 112A and second lead 112B positioned within a neurovascular sheath besides a respective IJV 102 of patient 14. Neurostimulation system 2 providing a first lead 112A to stimulate a left vagus nerve 104A and second lead 112B to stimulate a right vagus nerve may allow for selected stimulation pattern and/or bilateral stimulation of the vagus nerves, as discussed further herein. Bilateral stimulation may include selected subject benefits, as discussed herein. The stimulation, therefore, may be bilateral. As discussed herein, the bilateral stimulation may be provided to reduce nerve fatigue or reduce side effects. Further, the bilateral stimulation may alternate left and right and/or may be simultaneously both left and right.

In some examples, IMD 28 may adjust delivery of stimulation signal(s) based on a detected amount of activation of the vagus nerves. For example, sensing device 16 may detect and provide a level of activation of muscles controlled by laryngeal nerve. IMD 28 and/or computing device 12 may compare the detected amount by sensing device 16 to an activation threshold. In response to the detected amount of laryngeal muscle activation being greater than or equal to an activation threshold, IMD 28 and/or computing device 12 determines one or more of the vagus nerves is stimulated. In response to the detected amount of laryngeal muscle activation being less than the activation threshold, IMD 28 and/or computing device 12 determines the vagus nerves were either not stimulated or not adequately stimulated.

In response to IMD 28 and/or computing device 12 determining the vagus nerves were either not stimulated or not adequately stimulated, IMD 28 and/or computing device 12 may generate an output to indicate the vagus nerves were either not stimulated or not adequately stimulated. In some examples, stimulated, IMD 28 and/or computing device 12 may send an indication of whether first lead 112A and/or second lead 112B needs to be adjusted and/or features of the stimulation therapy via first lead 112A and/or second lead 112B needs to be adjusted. Some examples of adjustments may include adjusting one or more of an amplitude, waveform, pulse rate, duration, timing of left vagus nerve stimulation compared to right vagus nerve stimulation, proportion of the total stimulation for the left and right respectively and/or other features of the stimulation therapy provided via first lead 112A and/or second lead 112B.

In some examples, in response to IMD 28 and/or computing device 12 determining the vagus nerves were either not stimulated or not adequately stimulated, IMD 28 may adjust one or more features of the stimulation therapy provided via first lead 112A and/or second lead 112B. For example, IMD 28 may activate different electrodes in the first lead 112A and/or second lead 112B. In some examples, IMD 28 may adjust an amplitude, waveform, pulse rate, duration, timing of left vagus nerve stimulation compared to right vagus nerve stimulation, and/or other features of the stimulation therapy. In some examples, IMD 28 may adjust a duration and/or intensity of the stimulation therapy via first lead 112A and via second lead 112B to have different durations and/or intensities.

Figure 3:
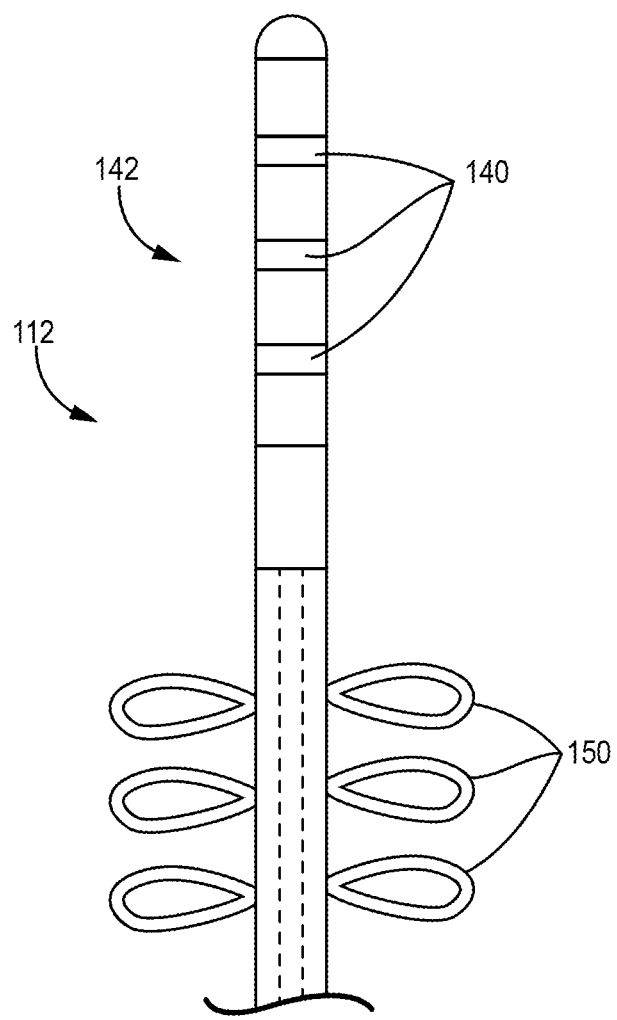
FIG. 3 depicts a conceptual diagram of an example of a lead in accordance with one or more techniques of the present disclosure.

FIG. 3 is an example of a conceptual diagram of a lead 112, which may be an example of first lead 112A and/or second lead 112B. Lead 112 may include a plurality of electrodes 140 and a plurality of anchoring mechanisms 150. Electrodes 140 may be referred to as stimulating electrodes, sensing electrodes, or stimulating/sensing electrodes. some examples, electrodes 140 may be a stimulating and/or sensing electrode. In some examples, electrodes 140 may be configured to deliver stimulation signal(s) and/or sense electrical activity. In some examples, electrodes 140 may be segmented electrodes. In some examples, electrodes 140 may be current steerable segmented electrodes. For example, first lead 112A may include current steerable segmented electrodes that may steer current directly at a left vagus nerve 104A, and/or second lead 112B may include current steerable segmented electrodes that may steer current directly at a right vagus nerve, which may help minimize collateral nerve capture. Anchoring mechanisms 150 may be configured to provide endovascular anchoring in IJV 102. For example, first lead 112A may include anchoring mechanisms to hold first lead 112A in left IJV 102A next to left vagus nerve 104A, and/or second lead 112B may include anchoring mechanisms to hold second lead 112B in right IJV 102B next to right vagus nerve. In an example, anchoring mechanism(s) 150 may safely secure, or provide stability for, a portion of a respective lead 112 to a wall of a blood vessel inside the body of the patient. By securing or increasing stability, anchoring mechanism(s) 150 may prevent unwanted movement of the respective lead 112 out of a targeted location in the body.

In some examples, first lead and/or second lead may be self-expanding stent like or braided structures with one or more electrodes arranged on the outside surface of the structure, such that the electrode is placed against the inside wall of respective IJV when the structure expands. In some examples, first lead and/or second lead may be one or more ring like structures with one or more electrodes arranged on the outside surface of the structure, or with the entire surface of one or more rings serving as an electrode, such that the electrodes are placed against the inside wall of the respective IJV when the structure expands. In some examples, first lead and/or second lead may be a loop structure (e.g. similar to an Achieve mapping catheter from Medtronic) with one or more electrodes arranged on the outside surface of the structure, such that the electrode is placed against the inside wall of the respective IJV when the structure expands. In some examples, first lead and/or second lead may be a helix structure with one or more electrodes arranged on the outside surface of the structure, such that the electrode is placed against the inside wall of the respective IJV when the structure expands.

Electrodes 140 are positioned at distal end or portion 142 of lead 112. Anchoring mechanisms 150 may also be, but are not necessarily, positioned at the distal end or portion 142, e.g., proximate to electrodes 140, to anchor the position/orientation of electrodes 140 relative to the vagus nerves. In the illustrated example, anchoring mechanisms 150 are positioned proximally on lead 112 with respect to the position of electrodes 140 at distal end 142 of lead 112. As an example, lead 112 being configured as described above may provide greater maneuverability and allow temporary trialing patients to test therapy responsiveness. In some examples, anchoring mechanisms 150 may be lantern-shaped, tines, and/or other shapes.

The anchoring mechanisms may include a passive anchoring mechanism, an active anchoring mechanism or a combination of both. In one embodiment, the anchoring mechanism is coupled at a distal end of the lead body and may also function as an electrically active element. Examples of passive anchoring mechanisms include flanges, flared ends of expandable stents or braids, hoops/rings/helices providing wall apposition within the IJV, disks, pliant tines, flaps, bio-adhesive surfaces, and/or any other non-piercing elements. Examples of active anchoring mechanisms may include rigid tines, prongs, barbs, hooks, clips, screws, and/or other projecting elements that pierce and penetrate into tissue to anchor the lead. As another example of an active anchoring mechanism, the lead may be provided with a side helix for engaging tissue.

The various examples of the anchoring mechanisms may be deployable. As such, the anchoring mechanism assumes a first state during maneuvering of the lead (during which time the lead is disposed within a lumen of a delivery system or overtop a guidewire or stylet) to the desired implant location. Subsequently, the anchoring mechanism assumes a second state following the release of the lead from the delivery system into the substernal space to thereby anchor the distal end portion of the lead body relative to the adjacent tissue. Electrodes may be positioned anywhere with respect to the anchoring mechanisms such that they are held against the inner wall of the IJV by the anchoring system, and may be an integral part of the anchoring system.

Neurostimulation system 2 may deliver stimulation signal(s) to patient 14 by generating and delivering a programmable electrical stimulation signal (e.g., in the form of electrical pulses or an electrical waveform) to a therapy site near electrodes 140 disposed. The distal end of a respective lead 112 may be inserted into patient 14 in such a manner as to locate electrodes 140 in a respective IJV 102 near a respective vagus nerve 104 of patient 14. Lead 112 may be constructed of biocompatible materials.

Lead 112 may include a plurality of electrodes 140. It is understood that any appropriate number of electrodes 140n may be provided. Each of the electrodes 140 may be electrically coupled to the stimulation circuitry 98 (FIG. 4) and may be controlled individually and/or in combination to provide stimulation signal(s) to one or more portions of a respective vagus nerve 104 The stimulation signal(s) through the electrodes 140 may be provided in any appropriate manner, such as discussed further herein. In various embodiments, for example, one of the electrodes 140, may be operated as an anode while a second electrode may be operated as a cathode. Thus, a voltage differential may be generated between the two electrodes to provide stimulation to one or more portions of the vagus nerve.

In some examples, two or more of electrodes 140 may be used to measure an impedance of tissue to determine a location of a target stimulation location, such as the vagus nerve. To measure the impedance of tissue, neurostimulation system 2 may source an electrical signal, such as current, to one electrode of electrodes 140, while another electrode of electrodes 140 sinks the electrical signal. Neurostimulation system 2 may then determine the voltage between these two electrodes. Neurostimulation system 2 may then determine the impedance of the tissue between the electrodes using a known value of the electrical signal sourced the determined voltage. Neurostimulation system 2 may also be configured to select the appropriate electrode combination of electrodes 140 and/or other stimulation parameters to stimulate the vagus nerves.

FIG. 4 is a block diagram illustrating an example configuration of IMD 28. As illustrated in FIG. 4, IMD 28 may include one or more of processing circuitry 90, stimulation circuitry 91, memory 92, telemetry circuitry 96, power source 97, sensing circuitry 98, or sensor(s) 99. In some examples, a combination of one or more of processing circuitry 90, stimulation circuitry 91, telemetry circuitry 96, and sensing circuitry 98 in IMD 28 may generally be referred to as circuitry. Memory 92 may store program instructions that, when executed by processing circuitry 90, cause processing circuitry 90 to provide the functionality ascribed to IMD 28 throughout this disclosure. In general, IMD 28 may include any suitable arrangement of hardware, alone or in combination with software and/or firmware, to perform the techniques attributed to IMD 28, and processing circuitry 90, stimulation circuitry, and telemetry circuitry 96 of IMD 28. In various examples, IMD 28 may include one or more processors, such as one or more microprocessors, DSPs, ASICs, FPGAs, or any other equivalent integrated or discrete logic circuitry, as well as any combinations of such components. IMD 28 also, in various examples, may include a memory 92, such as RAM, ROM, PROM, EPROM, EEPROM, flash memory, a hard disk, a CD-ROM, comprising executable instructions for causing the one or more processors to perform the actions attributed to them. Moreover, although processing circuitry 90 and telemetry circuitry 96 are described as separate circuitry, in some examples, processing circuitry 90 and telemetry circuitry 96 are functionally integrated. In some examples, processing circuitry 90 and telemetry circuitry 96 correspond to individual hardware units, such as microprocessors, ASICs, DSPs, FPGAs, or other hardware units. In other examples, any of processing circuitry 90 and telemetry circuitry 96 may correspond to multiple individual hardware units, such as microprocessors, ASICs, DSPs, FPGAs, or other hardware units.

In some examples, memory 92 may further include program information, e.g., stimulation programs defining the neurostimulation. Generally, stimulation circuitry 91 may generate and deliver electrical stimulation under the control of processing circuitry 90. In some examples, processing circuitry 90 controls stimulation circuitry 91 by accessing memory 92 to selectively access and load at least one of the stimulation programs to stimulation circuitry 91. For example, in operation, processing circuitry 90 may access memory 92 to load a stimulation program to stimulation circuitry 91. In other examples, stimulation circuitry 91 may access memory 92 and load one of the stimulation programs.

In some examples, the electrical stimulation signal(s) generated and delivered by stimulation circuitry 91 may be around 10 Hz.

In some examples, stimulation programs may include stimulation programs that are configured to facilitate different effects. For example, stimulation circuitry may use different stimulation programs to generate different electrical stimulation signals to cause different effects. In some examples, stimulation circuitry 91 may generate an electrical stimulation signal in the range of about 1 to 100 Hz or generate an electrical stimulation signal in the range of about 500 Hz to about 50 kHz. Stimulation circuitry 91 may deliver stimulation signal(s) to patient 14 for an extended period of time, such as minutes, hours, days, or until patient 14 or a clinician manually stops or changes the stimulation.

Stimulation circuitry 91 may deliver stimulation signal(s) according to stimulation parameters. Stimulation circuitry 91 may be electrically coupled to some or all of leads 112, such as first lead 112a and second lead 112b. In some examples, stimulation circuitry 91 may deliver stimulation signal(s) in the form of electrical pulses. In such examples, relevant stimulation parameters may include a voltage amplitude, a current amplitude, a pulse rate, a pulse width, a duty cycle, a duty cycle of the stimulation ON/OFF periods, or the combination of electrodes 140 and/or leads 112 that stimulation circuitry 91 uses to deliver stimulation signal(s). In other examples, stimulation circuitry 91 may deliver stimulation signal(s) in the form of continuous waveforms. In such examples, relevant stimulation parameters may include a voltage or current amplitude, a frequency, a shape of the stimulation signal, a duty cycle of the stimulation signal, or the combination of electrodes 140 and/or leads 112 stimulation circuitry 91 uses to deliver the stimulation signal(s).

Sensing circuitry 98 may be electrically coupled to some or all of leads 112, such as first lead 112a and second lead 112b. Sensing circuitry 98 may be electrically coupled to some or all of electrodes 140. Sensing circuitry 98 may be coupled to some or all of sensor(s) 99. While FIG. 4 shows sensor(s) 99 as a part of IMD 28, in some examples, one or more sensor(s) 99 may be positioned external to IMD 28 but are communicatively coupled to IMD 28 via the telemetry circuitry 96. Sensing circuitry 98 is configured to obtain signals sensed via one or more combinations of electrodes 140 and/or sensor(s) 99 and process the obtained signals. Sensing circuitry 98 may include one or more filters. In some examples, sensing circuitry 98 may be implemented in the processing circuitry 90 of IMD 28. The components of sensing circuitry 98 may be analog components, digital components or a combination thereof. Sensing circuitry 98 may, for example, include one or more sense amplifiers, filters, rectifiers, threshold detectors, analog-to-digital converters (ADCs) or the like. Sensing circuitry 98 may convert the sensed signals to digital form and provide the digital signals to processing circuitry 90 for processing or analysis. For example, sensing circuitry 98 may amplify signals from the sensing electrodes and convert the amplified signals to multi-bit digital signals by an ADC.

Telemetry circuitry 96 supports wireless or wired communication between IMD 28, computing device 12, sensor service 110, 210, and/or any other device, such as an implantable cardiac monitor, under the control of processing circuitry 90. Telemetry circuitry 96 may also be configured to communicate with another computing device via wireless communication techniques, or direct communication through a wired connection. In some examples, telemetry circuitry 96 may provide wireless communication via an RF, proximal inductive medium, or Tissue Conductance Communication (TCC). In some examples, telemetry circuitry 96 may include an antenna, which may take on a variety of forms, such as an internal or external antenna. In some examples, telemetry circuitry 96 may provide communication according to standards or protocols, such as 3G, 4G, 5G, WiFi (e.g., 802.11 or 802.15 ZigBee), Bluetooth®, or Bluetooth® Low Energy (BLE).

Examples of local wireless communication techniques that may be employed to facilitate communication between IMD 28 and another computing device include RF communication according to the 802.11 or Bluetooth specification sets, infrared communication, e.g., according to the IrDA standard, or other standard or proprietary telemetry protocols. In this manner, other external devices may be capable of communicating with IMD 28 without needing to establish a secure wireless connection.

Power source 98 delivers operating power to the components of IMD 28. Power source 98 may include a battery and a power generation circuit to produce the operating power. In some examples, the battery may be rechargeable to allow extended operation.

In some examples, one or more of electrodes 140 and/or sensor(s) 99 may detect an inflammatory cytokine level of patient 14 or another physiological parameter indicative of the inflammatory cytokine level of patient 14. Circuitry of IMD 28, e.g., processing circuitry 90, may be configured to determine a start of an inflammatory time window that corresponds to an onset of a stroke or traumatic brain injury (TBI) and an end of the inflammatory time window based on the detected inflammatory cytokine level. Circuitry of IMD 28, e.g., stimulation circuitry 91, may be configured to deliver the electrical energy to at least one of the first lead 112a and the second lead 112b to deliver the respective first and/or second stimulation signal(s) during the inflammatory time window in response to determining the start of the inflammatory time window. In some examples, circuitry of IMD 28 may be configured to adjust the delivery of electrical energy, such as a level of electrical energy being, a duration of delivery of electrical, or other variables of electrical energy delivery that may be adjust, to at least one of the first lead 112a and the second lead 112b to deliver the respective first and/or second stimulation signal(s) based on the determined inflammatory cytokine level. In some examples, neuromodulation system 2 may provide a closed-loop system in determining inflammatory cytokine level and providing/adjusting bilateral vagus nerve stimulation based on the determined inflammatory cytokine level, which may lead to improved patient health.

In some examples, one or more of sensor(s) 99 may be an accelerometer configured to detect motion of a laryngeal muscle of patient 14. The one or more accelerometers may be external to IMD 28 but are communicatively coupled to the circuitry of IMD 28. The circuitry of IMD 28 may be configured to determine laryngeal activity of patient 14 based on the detected motion of the laryngeal muscle. The circuitry of IMD 28 may be configured to adjust delivery of the electrical energy to at least one of the first lead 112a and the second lead 112b to deliver the respective first and/or second stimulation signal(s) based on the determined laryngeal activity of the patient. For example, if no laryngeal activity is detected, circuitry of IMD 28 may activate different electrodes of electrodes 140 or output an indication to move a respective lead 112. In some examples, if laryngeal activity is below a lower activity threshold, circuitry of IMD 28 may increase a level of electrical energy delivered to at least one of the first lead 112*a* and the second lead 112*b* to deliver the respective first and/or second stimulation signal(s).

In some examples, neurostimulation system 2 may further include a sensor device 110, 210 communicatively coupled to IMD 28. In some examples, neurostimulation system 2 may further include a sensor system including one or more sensor devices 110, 210 communicatively coupled to IMD 28. Some examples of sensor device 110, 210 are further described below with respect to FIGS. 5-9.

Circuitry of IMD 28 and/or sensor device 110, 210 may be configured to determine one or more of cardiac ischemia score of patient 14 based on ECG related measurements by the sensor device 110, 210 brain ischemia score based on detected parameter data of patient 14 by sensor device 110, 210, or a stroke/TBI score of patient 14 based on detected parameter data of patient 14 by sensor device 110, 210. Cardiac ischemia score may be determined based on ECG related measurements detected by IMD 28, sensor device 110, 210, and/or a separate implantable cardiac monitor (ICM) communicatively coupled to IMD 28. Some examples of ECG related measurements include ST elevation to be triggered after a myocardial infarct, QT corrected for heart rate and T-wave, the short term variability of the QT interval compared to previous beats, heart rate variability in time or frequency domain, heart rate recovery, and deceleration capacity. In some examples, pulmonary arterial pressure and/or pressure near organ site may also influence a cardiac ischemia score.

In some examples, IMD 28, sensor device 110, 210, and/or sensing device 16 may be configured to detect heart rate of patient 14 as a decreased heart rate may be an indication of vagus nerve stimulation. In some examples, a heart rate not decreasing or not decreasing by an amount more than a threshold may be an indication the vagus nerves are not being stimulated and/or adequately stimulated. IMD 28 may adjust delivery of the electrical energy to at least one of the first lead 112*a* and the second lead 112*b* based on the detected heart rate. For example, IMD 28 may determine a change in heart rate over a period of time, for example a decrease in heart rate, and compare the change in heart rate to a decrease in heart rate threshold.

In response to the detected amount of decrease in heart rate being an amount greater than or equal to a decrease in heart rate threshold, IMD 28 and/or computing device 12 determines vagus nerve stimulation is adequately activated. In response to the detected amount of decrease in heart rate being less than the decrease in heart rate threshold, IMD 28 and/or computing device 12 determines the vagus nerves were either not stimulated or not adequately stimulated.

In response to IMD 28 and/or computing device 12 determining the vagus nerves were either not stimulated or not adequately stimulated, IMD 28 and/or computing device 12 may generate an output to indicate the vagus nerves were either not stimulated or not adequately stimulated. In some examples, stimulated, IMD 28 and/or computing device 12 may send an indication of whether first lead 112A and/or second lead 112B needs to be adjusted and/or features of the stimulation therapy via first lead 112A and/or second lead 112B needs to be adjusted. Some examples of adjustments may include adjusting one or more of an amplitude, waveform, pulse rate, duration, and/or other features of the stimulation therapy provided via first lead 112A and/or second lead 112B.

In some examples, in response to IMD 28 and/or computing device 12 determining the vagus nerves were either not stimulated or not adequately stimulated, IMD 28 may adjust one or more features of the stimulation therapy provided via first lead 112A and/or second lead 112B. For example, IMD 28 may activate different electrodes in the first lead 112A and/or second lead 112B. In some examples, IMD 28 may adjust an amplitude, waveform, pulse rate, duration, and/or other features of the stimulation therapy. In some examples, IMD 28 may adjust a duration and/or intensity of the stimulation therapy via first lead 112A and via second lead 112B to have different durations and/or intensities.

Brain ischemia score may be determined based on one or more of EEG, ECG, accelerometer, or impedance levels determined by sensor device 110, 210. Stroke/TBI recovery score may be determined based on one or more of EEG, ECG, accelerometer, impedance levels determined by sensor device 110, 210, or one or more XR parameters as discussed below.

In some examples, IMD 28 may adjust delivery of the electrical energy to at least one of the first lead 112*a* and the second lead 112*b* based on the determined cardiac ischemia score, brain ischemia score, and/or stroke/TBI score. For example, IMD 28 may compare the determined cardiac ischemia score to a cardiac ischemia threshold, compare the determine brain ischemia score to a brain ischemia threshold, and/or compare the determined stroke/TBI score to a stroke/TBI threshold. For example, when IMD 28 determines the cardiac ischemia score is greater than or equal to a cardiac ischemia threshold, IMD 28 may activate delivery of electrical energy to provide stimulation signal(s) to at least one of the first lead 112*a* and the second lead 112*b* to provide vagus nerve stimulation. When IMD 28 determines the stroke/TBI injury score is greater than or equal to a stroke/TBI threshold, IMD 28 may activate delivery of electrical energy to provide stimulation signal(s) to at least one of the first lead 112*a* and the second lead 112*b* to provide vagus nerve stimulation. In some examples, neuromodulation system 2 may provide a closed-loop system in determining stroke/TBI injury score and providing/adjusting bilateral vagus nerve stimulation based on the determined stroke/TBI injury score, which may lead to improved patient health.

In some examples, IMD 28 and/or sensor device 110, 210 may be configured to determine a stroke/TBI recovery score of patient 14 based on detected parameter data of patient 14 by sensor device 110, 210. IMD 28 may adjust delivery of the electrical energy to at least one of the first lead 112*a* and the second lead 112*b* based on the determined stroke/TBI recovery score.

In some examples, computing device 12 may include extended reality (XR) sensors that may be head mounted to track one or more XR parameters such as motion of a head/body of patient 14, eye gaze of patient 14, kinetic linkages for limbs of patient 14, haptic/tactile feedback, fine motor skills response when manipulating objects, etc. IMD 28 may receive XR parameters from computing device 12. In some examples, XR sensors may be head mounted. IMD 28 may be further configured to determine a stroke/TBI recovery score one or more of EEG, ECG, accelerometer, or impedance levels determined by sensor device 110, 210 and one or more XR parameters. IMD 28 may adjust delivery of the electrical energy to at least one of the first lead 112*a* and the second lead 112*b* based on the determined stroke/TBI recovery score. In some examples, neuromodulation system 2 may provide a closed-loop system in determining stroke/TBI recovery score and providing/adjusting bilateral vagus nerve stimulation based on the determined stroke/TBI recovery score, which may lead to improved patient recovery and health.

Figure 5:
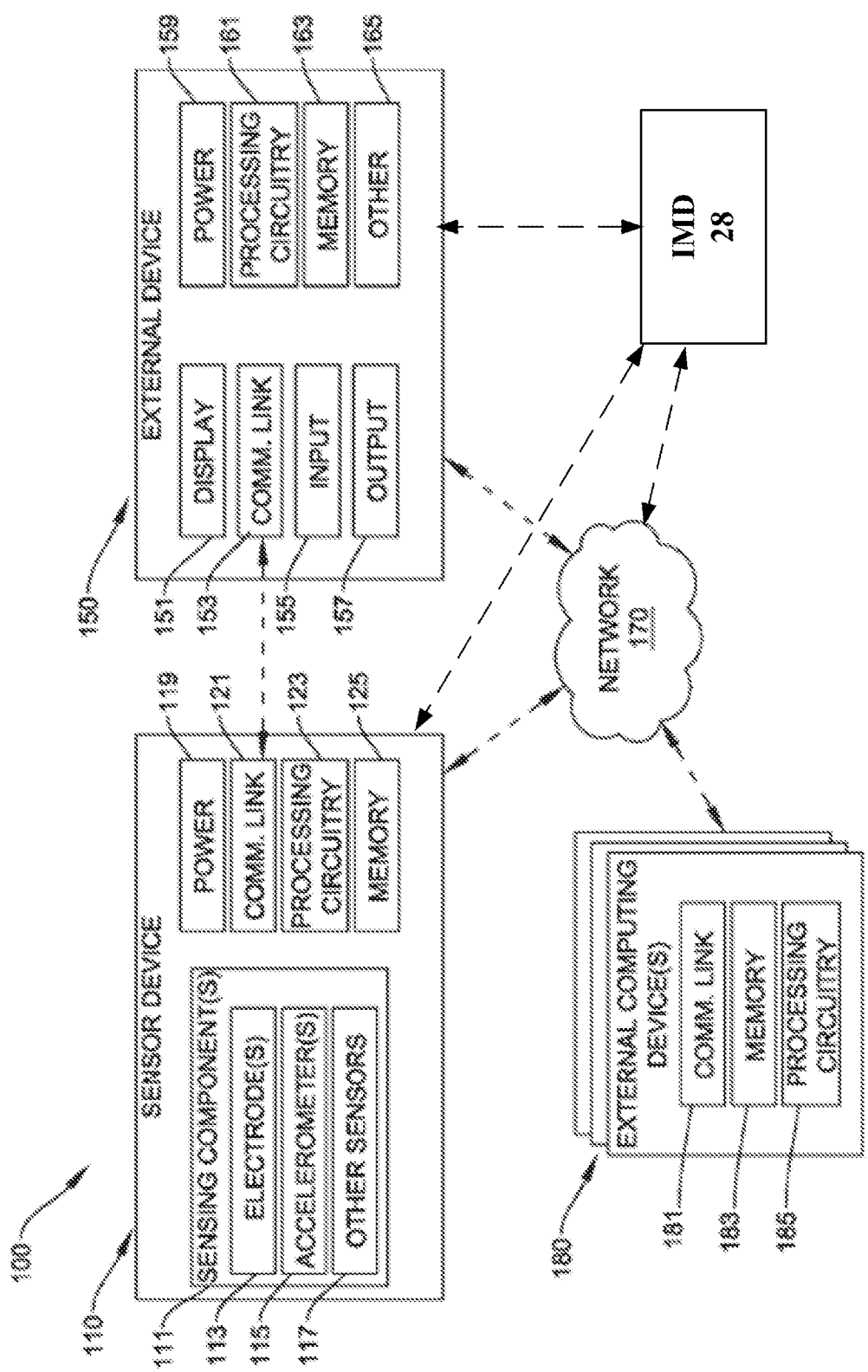
FIG. 5 is a schematic diagram of an example stroke detection system configured in accordance with one or more techniques of the present disclosure.

FIG. 5 is a schematic diagram of an example sensor system 100. Although the sensor system 100 is shown with certain devices for purposes of explanation, in various examples any one or more of the devices shown in FIG. 5 can be omitted. Similarly, although the devices shown in FIG. 5 are illustrated as including certain components, in various examples any one or more of the particular components within these devices can be omitted (e.g., the sensor device 110 may omit the accelerometer 115). Moreover, any of the devices can include additional components not specifically shown here.

The sensor system 100 can be configured to sense physiological patient data and analyze that data to make a stroke determination. In an example, the sensor system 100 includes a sensor device 110 that is configured to be implanted in a target site of the patient or disposed over the skin of the patient at a target site. In some examples, the sensor device may be a relatively small device, and may be placed (e.g., inserted) under or over the skin at the back of the patient's neck or base of the skull. As described in more detail below, the sensor device 110 may detect one more physiological parameters of a patient (e.g., electrical activity corresponding to brain activity in particular regions of the patient's brain, ECG data, motion data, etc.). The sensor device 110 may be communicatively coupled to an external device 150, for example via a wireless connection. In some embodiments, the external device 150 can be a mobile device (e.g., a smartphone, tablet, smartwatch, etc.) or other computing device with which the patient can interact. In operation, the patient may receive output or instructions from the external device 150 that are based at least in part on data received at the external device 150 from the sensor device 110. For example, the external device 150 may provide an alert to the patient or another entity (e.g., a call center) based on a stroke indication provided by the sensor device 110. Additionally or alternatively, the external device 150 may output user prompts which can be synchronized with data collection via the sensor device 110. For example, the external device 150 may instruct the user to lift an arm, make a facial expression, etc., and the sensor device 110 may record physiological data while the user performs the requested actions. Moreover, the external device 150 may itself analyze the patient (e.g., the patient's activity or condition in response to such prompts), for example using a camera to detect facial drooping, using a microphone to detect slurred speech, or to detect any other indicia of stroke. In some embodiments, such indicia can be compared against pre-stroke inputs (e.g., a stored baseline facial image or voice-print with baseline speech recording).

The sensor device 110 may also be communicatively coupled with IMD 28. IMD 28 may receive information from sensor device 110 via external device 150. For example, IMD 28 may communicate directly with external device 150 which communicates with sensor device 110. In some examples, IMD 28 may communicate directly with sensor device 110 and receive information directly from sensor device 110. In some examples, sensor device 110, external device 150, and/or IMD 28 may be communicatively coupled with each other over network 170.

The sensor device 110 and/or the external device 150 can also be communicatively coupled with one or more external computing devices 180 (e.g., over network 170). In some examples, the external computing devices 180 can take the form of servers, personal computers, tablet computers or other computing devices associated with one or more healthcare providers (e.g., hospitals, medical data analytic companies, device manufacturers, etc.). These external computing devices 180 can collect data recorded by the sensor device 110 and/or the external device 150. In some embodiments, such data can be anonymized and aggregated to perform large-scale analysis (e.g., using machine-learning techniques or other suitable data analysis techniques) to develop and improve stroke detection algorithms using data collected by a large number of sensor devices 110. Additionally, the external computing devices 180 may transmit data to the external device 150 and/or the sensor device 110. For example, an updated algorithm for making stroke determinations may be developed by the external computing devices 180 (e.g., using machine learning or other techniques) and then provided to the sensor device 110 and/or the external device 150 via the network (e.g., as an over-the-air update), and installed on the sensor device 110 and/or external device 150.

In some examples, the sensor system 100 may also include additional implantable devices, such as IMD 28, implantable cardiac monitors, an implantable pacemaker, an implantable cardiac defibrillator, a cardiac resynchronization therapy (CRT) device (e.g., CRT-D defibrillator or CRT-P pacemaker), a neurostimulator, a deep-brain stimulation device, a nerve stimulator, a drug pump (e.g., an insulin pump), a glucose monitor, or other devices. Other devices that may support and enhance a personal ecosystem to reduce stroke risk include fitness monitors, nutrition devices, etc. Additionally or alternatively, a stroke detection device can be used in conjunction with other disease therapies with high risk of stroke as an adverse event (e.g., LVAD devices, TAVI/TAMR devices, bariatric/gastric surgery, etc.). In some examples of this disclosure, a system including both sensor device 110 and IMD 28 may be referred to as neurostimulation system 2 and/or sensor system 100.

As noted previously, the sensor device 110 is configured to be coupled to a patient for recording physiological data relevant to a stroke determination. For example, the sensor device 110 can be implanted within the body of a patient, may be disposed directly over a patient's skin (e.g., held in place via an adhesive or fastener), or may be removably worn by the patient. The sensor device 110 includes sensing components 111, which can include a number of different sensors and/or types of sensors. For example, the sensing components 111 can include a plurality of electrodes 113, an accelerometer 115, and optionally other sensors 117. Examples of other sensors 117 include a blood pressure sensor, a pulse oximeter, an ECG sensor or other heart-recording device, an EMG sensor or other muscle-activity recording device, a temperature sensor, a skin galvanometer, hygrometer, altimeter, gyroscope, magnetometer, proximity sensor, hall effect sensors, or any other suitable sensor for monitoring physiological characteristics of the patient. These particular sensing components 111 are exemplary, and in various embodiments the sensors employed can vary.

The electrodes 113 may be configured to detect electrical activity such as brain activity (e.g., EEG data), heart activity (e.g., ECG data), and/or muscle activity (e.g., EMG data). The electrodes 113 may be formed from any suitable conductive material or materials to enable the electrodes to perform electrical measurements on the patient. In some embodiments, the sensor device 110 can be configured to analyze data from the electrodes 113 to extract both brain activity data (e.g., EEG signals) and heart activity data (e.g., ECG signals). The brain activity data may be evaluated to provide a stroke determination or other assessment of brain condition, while the heart activity data may be evaluated to provide an assessment of heart condition or to detect certain cardiac events (e.g., heart rate variability, arrhythmias (e.g., tachyarrhythmias or bradycardia), ventricular or atrial fibrillation episodes, etc.

In some examples, the sensor device 110 is configured to analyze data from the electrodes 113 to extract brain activity data and to discard or reduce any contribution from heart or muscle activity. In some embodiments, the electrodes 113 are configured to be disposed over the patient's skin. In such embodiments, the electrodes 113 can include protrusions (e.g., microneedles or other suitable structures) configured to at least partially penetrate the patient's skin so as to improve detection of subcutaneous electrical activity. In some embodiments, the sensor device 110 can be configured to be implanted within the body (e.g., subcutaneously), and as such the electrodes 113 can include a conductive surface exposed along at least a portion of the sensor device 110 so as to detect electrical activity within the body.

The sensor device 110 may be configured to calculate physiological characteristics relating to one or more electrical signals received from the electrodes 113. For example, the sensor device 110 may be configured to algorithmically determine the presence or absence of a stroke or other neurological condition from the electrical signal. In certain embodiments, the sensor device 110 may make a stroke determination for each electrode 113 (e.g., channel) or may make a stroke determination using electrical signals acquired from two or more selected electrodes 113.

In various examples, the number and configuration of electrodes 113 can vary. For example, the sensor device 110 can include at least 2, at least 3, at least 4, at least 5, or more electrodes 113 in an array. In some embodiments, the sensor device 110 includes fewer than 6, fewer than 5, fewer than 4, or fewer than 3 electrodes 113 in an array. As described in more detail below, although conventional EEG arrays include a large number of electrodes disposed over the top of a patient's head, some embodiments of the present technology include a relatively small number of electrodes (e.g., three electrodes) configured to be placed over the back of the patient's neck or base of the skull. In this position, electrical data collected via these electrodes 113 may correspond to brain activity in regions determined to be of interest for stroke determination (e.g., the P3, Pz, and/or P4 regions).

In some examples, the electrodes 113 may all reside within a single housing of the sensor device 110. In some embodiments, the electrodes 113 may extend away from a housing of the sensor device 110 and be connected via leads or other connective components. For example, the sensor device 110 can include a housing that encompasses certain components (e.g., the power 119, communications link 121, processing circuitry 123, and/or memory 125), and the electrodes 113 (and/or other sensing components 111) can be coupled to the housing via electrical leads or other suitable connections. In such configurations, the electrodes 113 can be positioned at locations spaced apart from the housing of the sensor device 110. In some embodiments, the electrodes 113 can be disposed within discrete housings that are in turn coupled to a housing containing the other components of the sensor device 110. Such a configuration, in which multiple housings (or sub-housings) are coupled together via flexible or other connectors, may facilitate placement of the sensor device 110 at a desired location to improve patient comfort. Additionally, this may facilitate placement of electrodes 113 at desirable positions for detecting clinically useful brain activity data.

The accelerometer 115 can be configured to detect patient movement. In some embodiments, patient movement data collected via the accelerometer 115 can be used to make a fall determination. Fall detection can be particularly valuable when assessing potential stroke patients, as a large percentage of patients admitted for ischemic or hemorrhagic stroke have been found to have had a significant fall within 15 days of the stroke event. Accordingly, in some embodiments, the sensor device 110 can be configured to initiate monitoring of brain activity via the electrodes 113 upon fall detection using the accelerometer 115. In some embodiments, the sensing performed via the electrodes 113 can be modified in response to a fall determination, for example with an increased sampling rate or other modification. In addition to fall detection, the accelerometer 115 (or similar sensor) can be used to determine potential body trauma due to sudden acceleration and/or deceleration (e.g., a vehicular accident, sports collision, concussion, etc.). These events could be thrombolytic, a precursor to stroke.

The sensor device 110 can also include a power source 119 (e.g., a battery, capacitors). In some embodiments, the power source 119 can be rechargeable, for example using inductive charging or other wireless charging techniques. Such rechargeability can facilitate long-term placement of the sensor device 110 on or within a patient.

A communications link 121 enables the sensor device 110 to transmit to and/or receive data from external devices (e.g., external device 150 or external computing devices 180). The communications link 121 can include a wired communication link and/or a wireless communication link (e.g., Bluetooth, Near-Field Communications, LTE, 5G, Wi-Fi, infrared and/or another wireless radio transmission network).

The processing circuitry 123 can include one or more CPUs, ASICs, digital signal processing circuitry, or any other suitable electrical components configured to process data from the sensing components 111 and control operation of the sensor device 110. In some embodiments, the processing circuitry 123 includes hardware particularly adapted for artificially intelligence and/or machine learning applications, for example, a tensor processing unit (TPU) or other such hardware. In certain embodiments, the processing circuitry of the sensor device 110 may include one or more input protection circuits to filter the electrical signals and may include amplifier/filter circuitry to remove DC and high frequency components, one or more analog-to-digital (A/D) converters, or any other suitable components.

The sensor device 110 can further include memory 125, which can take the form of one or more computer readable storage modules configured to store information (e.g., signal data, subject information or profiles, environmental data, data collected from one or more sensing components, media files) and/or executable instructions that can be executed by the processing circuitry 123. The memory 125 can include, for example, instructions for analyzing patient data to determine whether a patient is undergoing or has recently or previously undergone a stroke. In some embodiments, the memory 125 stores data (e.g., signal data acquired from the sensing components 111) used in the stroke detection techniques disclosed herein.

As noted above, in some examples, the sensor device 110 may also communicate with an external device 150. The external device 150 can be, for example, a smartwatch, smartphone, laptop, tablet, desktop PC, or any other suitable computing device and can include one or more features, applications and/or other elements commonly found in such devices. For example, the external device 150 can include display 151, a communications link 153 (e.g., a wireless transceiver that may include one or more antennas for wirelessly communicating with, for example, other devices, websites, and the sensor device 110). Communication between the external device 150 and other devices can be performed via, e.g., a network 170 (which can include the Internet, public and private intranet, a local or extended Wi-Fi network, cell towers, the plain old telephone system (POTS), etc.), direct wireless communication, etc. The external device 150 can additionally include well-known input components 131 and output components 133, including, for example, a touch screen, a keypad, speakers, a camera, etc.

In operation, the patient may receive output or instructions from the external device 150 that are based at least in part on data received at the external device 150 from the sensor device 110. For example, the sensor device 110 may generate a stroke indication based on analysis of data collected via sensing components 111. The sensor device 110 may then instruct the external device 150 to output an alert to the patient (e.g., via display 151 and/or output 157) or another entity. In some embodiments, the alert can both be displayed to the user (e.g., via display 151 of the external device) and can also be transmitted to an appropriate emergency medical response service (e.g., a 9-1-1 call may be placed with location data from the external device 150 used to direct responders to locate the patient), and/or to other healthcare provider entities or individuals (e.g. a hospital, emergency room, or physician). In some embodiments, embedded circuitry that provides location data (e.g., a GPS unit) can be included within the sensor device 110.

Additionally or alternatively, the external device 150 may output user prompts which may be used in conjunction with physiological data collection via the sensor device 110. For example, the external device 150 may instruct the user to perform an action (e.g., lift an arm, make a facial expression, etc.), and the sensor device 150 may record physiological data while the user performs the requested actions. In some embodiments, the external device 150 may itself analyze physiological parameters of the patient, for example using a camera to detect facial drooping or other indicia of stroke. In some embodiments, such physiological data collected via the external device 150 can be combined with data collected via the sensing components 111 and analyzed together to make a stroke determination.

As noted previously, the external computing device(s) 180 may take the form of servers or other computing devices associated with healthcare providers or other entities. The external devices can include a communications link 181 (e.g., components to facilitate wired or wireless communication with other devices either directly or via the network 170), a memory 183, and processing circuitry 185. These external computing devices 180 can collect data recorded by the sensor device 110 and/or the external device 150. In some embodiments, such data can be anonymized and aggregated to perform large-scale analysis (e.g., using machine-learning techniques or other suitable data analysis techniques) to develop and improve stroke detection algorithms using data collected by a large number of sensor devices 110 associated with a large population of patients. Additionally, the external computing devices 180 may transmit data to the external device 150 and/or the sensor device 110. For example, an updated algorithm for making stroke determinations may be developed by the external computing devices 180 (e.g., using machine learning or other techniques) and then provided to the sensor device 110 and/or the external device 150 via the network 170, and installed on the recipient device 110/150.

Figure 6A:
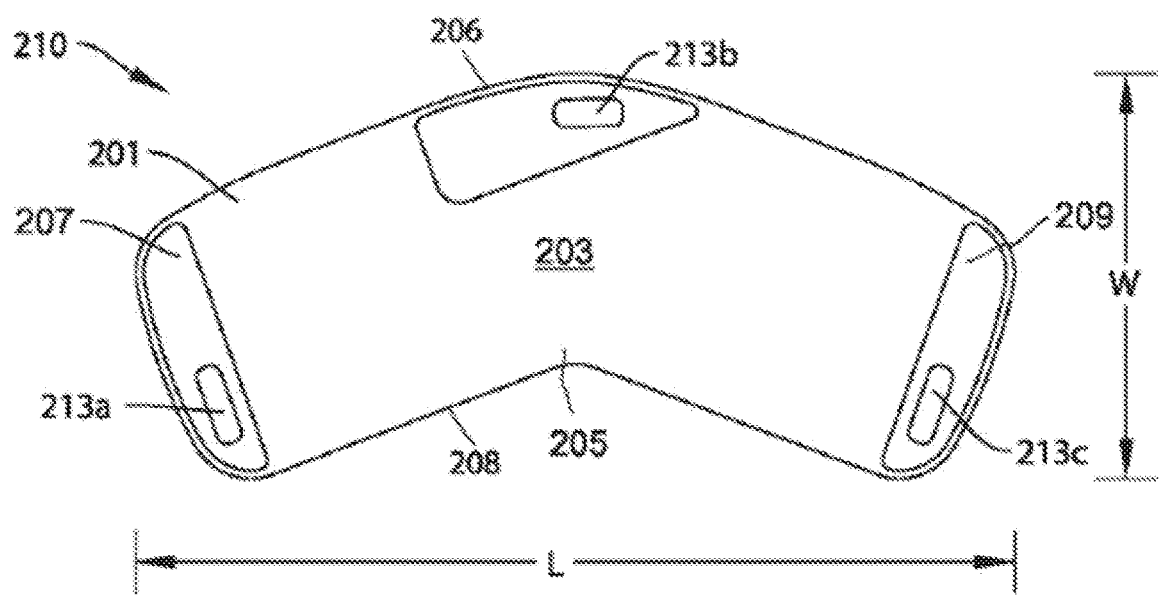
FIG. 6A depicts a top view of an example sensor device in accordance with one or more techniques of the present disclosure.

FIG. 6A illustrates a plan view of an example sensor device 210. In some embodiments, the sensor device 210 can include some or all of the features of the sensor device 110 described above with respect to FIG. 5 and/or the sensor device 310 described below with respect to FIG. 7, and can include additional features as described in connection with FIG. 6A. In the illustrated example, the sensor device 210 includes a housing 201 that carries a plurality of electrodes 213a-c (collectively "electrodes 213") therein. In operation, the electrodes 213a-c can be placed in direct contact with tissue at the target site (e.g., with the user's skin if placed over the user's skin, or with subcutaneous tissue if the sensor device 210 is implanted). The housing 201 additionally encloses electronic circuitry located inside the sensor device 210 and protects the circuitry contained therein from body fluids. In various embodiments, the electrodes 213 can be disposed along any surface of the sensor device 210 (e.g., anterior surface, posterior surface, left lateral surface, right lateral surface, superior side surface, inferior side surface, or otherwise), and the surface in turn may take any suitable form.

Figure 6B:
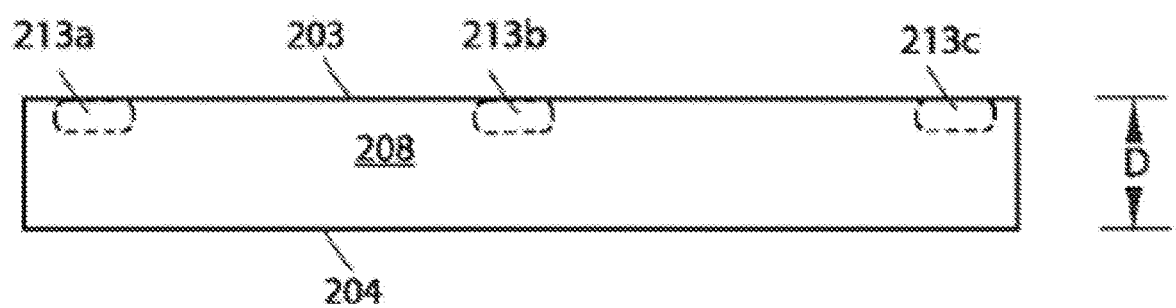
FIG. 6B depicts a side view of the example sensor device shown in FIG. 6A in accordance with one or more techniques of the present disclosure.

In the example of FIGS. 6A and 6B, the housing 201 may be a biocompatible material having a relatively planar shape including a first major surface 203 configured to face towards the tissue of interest (e.g., to face anteriorly when positioned at the back of the patient's neck) a second major surface 204 opposite the first, and a depth D or thickness of the housing 201 extending between the first and second major surfaces. The housing 201 can define a superior side surface 206 (e.g., configured to face superiorly when the device 101 is implanted in or at the patient's neck) and an opposing inferior side surface 208. The housing 201 can further include a central portion 205, a first lateral portion (or left portion) 207, and a second lateral portion (or right portion) 209. The electrodes 213 are distributed about the housing 201 such that a central electrode 213b is disposed within the central portion 205 (e.g., substantially centrally along a horizontal axis of the device), a left electrode 213a electrode is disposed within the left portion 207, and a right electrode 213c is disposed within the right portion 209. As illustrated, the housing 201 can define a boomerang or chevron-like shape in which the central portion 205 includes a vertex, with the first and second lateral portions 207 and 209 extending both laterally outward and from the central portion 205 and also at a downward angle with respect to a horizontal axis of the device.

The configuration of the housing 201 may facilitate placement either over the user's skin in a bandage-like form or for subcutaneous implantation. As such, a relatively thin housing 201 can be advantageous. Additionally, the housing 201 can be flexible in some embodiments, so that the housing 201 can at least partially bend to correspond to the anatomy of the patient's neck (e.g., with left and right lateral portions 207 and 209 of the housing 201 bending anteriorly relative to the central portion 205 of the housing 201).

In some examples, the housing 201 can have a length L of between about 15-50 mm, between about 20-30 mm, or about 25 mm. The housing 201 can have a width W of between about 2.5-15 mm, between about 5-10 mm, or about 7.5 mm. In some embodiments, the housing 201 can have a thickness of the thickness is less than about 10 mm, about 9 mm, about 8 mm, about 7 mm, about 6 mm, about 5 mm, about 4 mm, or about 3 mm. In some embodiments, the thickness of the housing 201 can be between about 2-8 mm, between 3-5 mm, or about 4 mm. The housing 201 can have a volume of less than about 1.5 cc, about 1.4 cc, about 1.3 cc, about 1.2 cc, about 1.1 cc, about 1.0 cc, about 0.9 cc, about 0.8 cc, about 0.7 cc, about 0.6 cc, about 0.5 cc, or about 0.4 cc. In some embodiments, the housing 201 can have dimensions suitable for implantation through a trocar introducer or any other suitable implantation technique.

As illustrated, the electrodes 213 carried by the housing 201 are arranged so that all three electrodes 213 do not lie on a common axis. In such a configuration, the electrodes 213 can achieve a better signal vector as compared to electrodes that are all aligned along a single axis. This can be particularly useful in a sensor device 210 configured to be implanted at the neck while detecting electrical activity in the brain. In some embodiments, this electrode configuration also provides for improved cardiac ECG sensitivity by integrating 3 potential signal vectors.

In the example shown in FIG. 6B, all three electrodes 213 are located on the first major surface 203 and are substantially flat and outwardly facing. However, in other examples one or more electrodes 213 may utilize a three-dimensional configuration (e.g., curved around an edge of the device 210) Similarly, in other examples one or more electrodes 213 may be disposed on the second major surface opposite the first. The various electrode configurations allow for configurations in which electrodes 213 are located on both the first major surface and the second major surface. In other configurations, such as that shown in FIG. 6B, electrodes 213 are only disposed on one of the major surfaces of the housing 201. The electrodes 213 may be formed of a plurality of different types of biocompatible conductive material (e.g., stainless steel, titanium, platinum, iridium, alloys thereof, or conductive polymers such as poly(3,4-ethylenedioxythiophene) polystyrene sulfonate (PEDOT)), and may utilize one or more coatings such as titanium nitride or fractal titanium nitride. In some embodiments, the material choice for electrodes can also include materials having a high surface area (e.g., to provide better electrode capacitance for better sensitivity) and roughness (e.g., to aid implant stability). Although the example shown in FIG. 6 includes three electrodes 213, in some embodiments the sensor device 210 can include 1, 2, 4, 5, 6, or more electrodes carried by the housing 201.

Figure 6C:
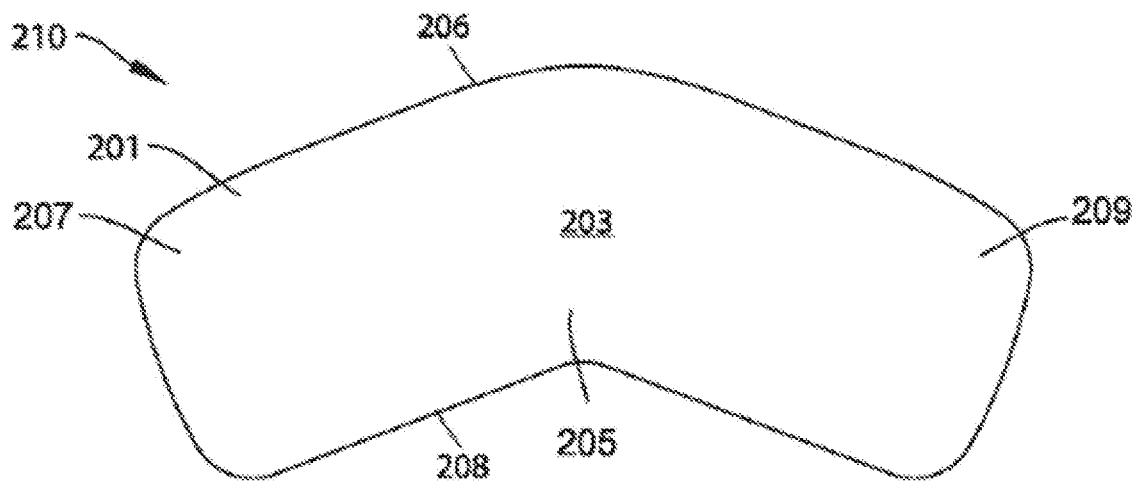
FIG. 6C depicts a top view of an example sensor device in accordance with one or more techniques of the present disclosure.
Figure 6D:
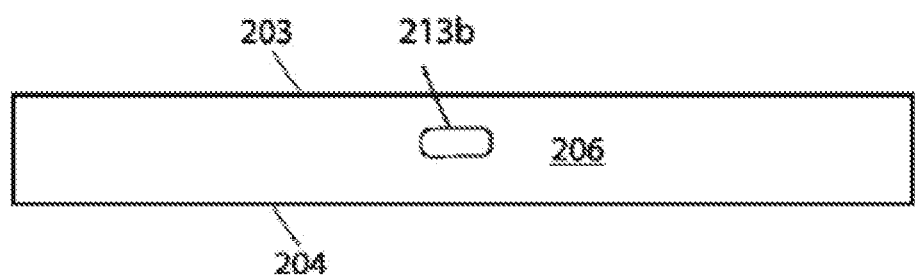
FIG. 6D depicts a side view of an example sensor device in accordance with one or more techniques of the present disclosure.
Figure 6E:
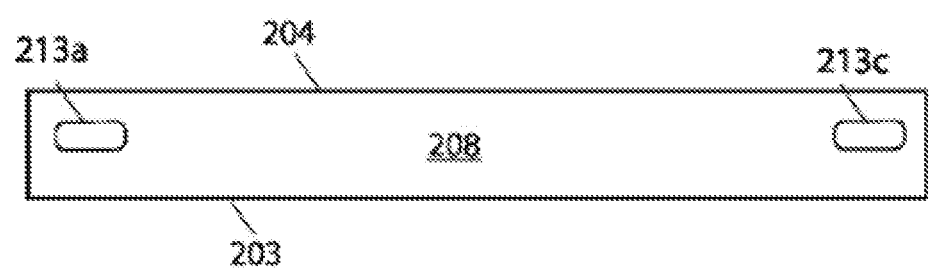
FIG. 6E depicts a side view of an example sensor device in accordance with one or more techniques of the present disclosure.
Figure 6F:
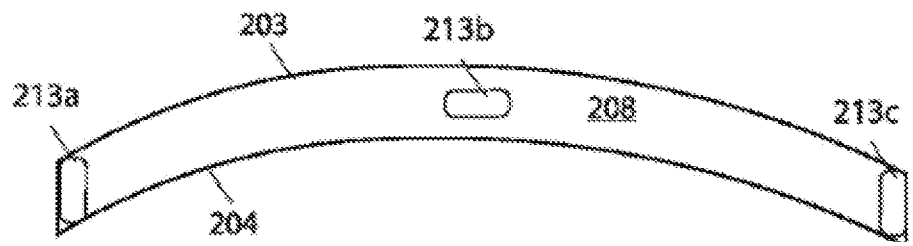
FIG. 6F depicts a side view of an example sensor device in accordance with one or more techniques of the present disclosure.

FIG. 6C illustrates another example embodiment in which the electrodes 213 are not exposed along the first major surface 203 of the housing 201. Instead, the electrodes 213 can be exposed along superior and inferior side surfaces (e.g., facing superiorly and inferiorly when implanted at or on a patient's neck), as shown in FIGS. 6D and 6E. FIG. 6F illustrates another example in which the housing 201 assumes a curved configuration, and in which the electrodes can be place along the superior and/or inferior side surfaces of the housing 201. In some embodiments, a curved configuration can improve patient comfort and more readily conform to the anatomy of the patient's neck region.

In operation, the electrodes 213 may be used to sense electrical signals (e.g., EEG signals) which may be submuscular or subcutaneous. The sensed electrical signals may be stored in a memory of the sensor device 210, and signal data may be transmitted via a communications link to another device (e.g., external device 150 of FIG. 5). The sensed electrical signals may be time-coded or otherwise correlated with time data, and stored in this form, so that the recency, frequency, time of day, time span, or date(s) of a particular signal data point or data series (or computed measures or statistics based thereon) may be determined and/or reported. In some examples, electrodes 213 may additionally or alternatively be used for sensing any bio-potential signal of interest, such as an electrocardiogram (ECG), intracardiac electrogram (EGM), electromyogram (EMG), or a nerve signal, from any implanted location. These data may be time-coded or time-correlated, and stored in that form, in the manner described above with respect to EEG signal data.

Figure 7A:
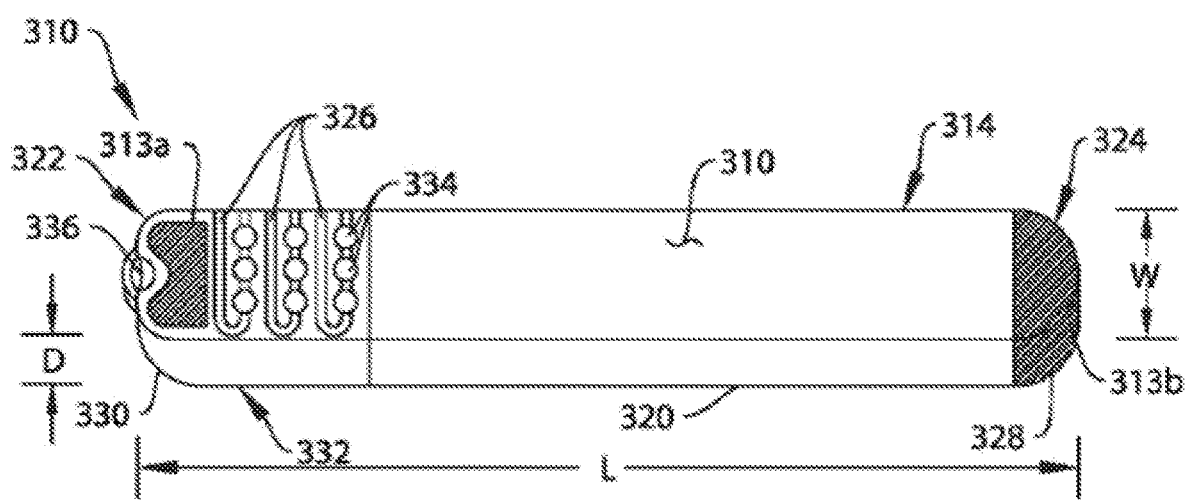
FIG. 7A depicts an example sensor device in accordance with one or more techniques of the present disclosure.
Figure 7B:
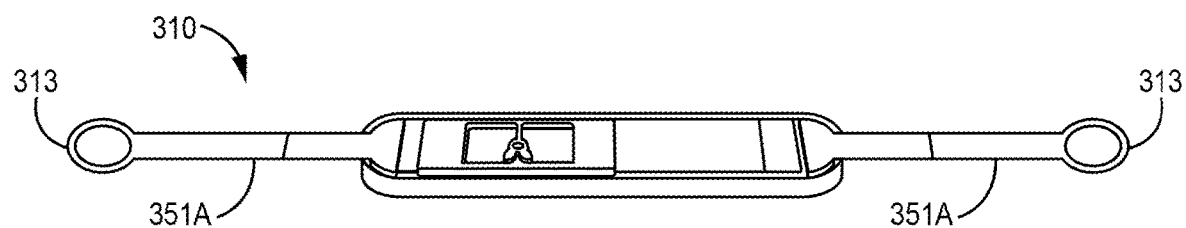
FIG. 7B an example sensor device having dual electrode extensions in accordance with one or more techniques of the present disclosure.
Figure 7C:
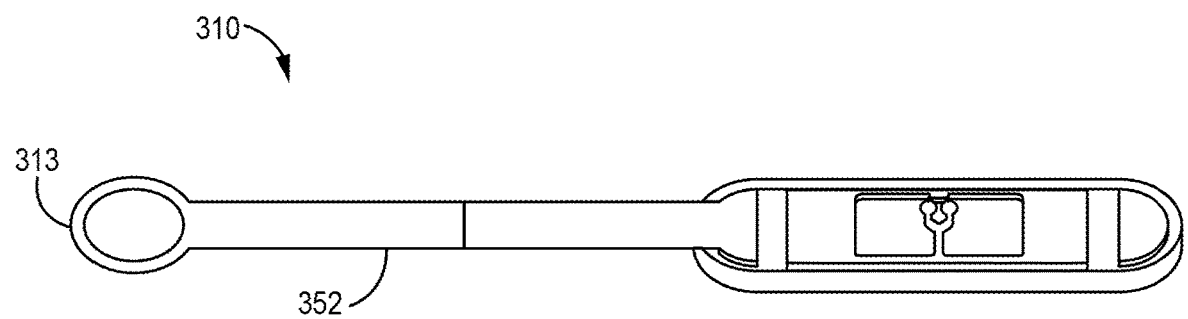
FIG. 7C an example sensor device having a single electrode extension in accordance with one or more techniques of the present disclosure.

FIGS. 7A, 7B, 7C illustrate other examples of sensor device 310. In some embodiments, the sensor device 310 can include some or all of the features of the sensor devices 110 and 210 described above with respect to FIGS. 5 and 6 in accordance with embodiments of the present technology, and can include additional features as described in connection with FIGS. 7A, 7B, 7C. While the following description may refer to sensor 310 in FIG. 7A, the sensor device 310 in FIG. 7B and/or FIG. 7C can include some or all of the features of sensor device 310 described below with respect to FIG. 7A. In the example shown in FIG. 7A, sensor device 310 may be embodied as a monitoring device having housing 314, proximal electrode 313a and distal electrode 313b (individually or collectively "electrode 313" or "electrodes 313"). Housing 314 may further comprise first major surface 318, second major surface 320, proximal end 322, and distal end 324. Housing 314 encloses electronic circuitry located inside the sensor device 310 and protects the circuitry contained therein from body fluids. Electrical feedthroughs provide electrical connection of electrodes 313. In an example, sensor device 310 may be embodied as an external monitor, such as patch that may be positioned on an external surface of the patient, or another type of medical device (e.g., instead of as an ICM), such as described further herein.

In the example shown in FIG. 7A, sensor device 310 is defined by a length "L," a width "W," and thickness or depth "D." sensor device 310 may be in the form of an elongated rectangular prism wherein the length L is significantly larger than the width W, which in turn is larger than the depth D. In one example, the geometry of the sensor device 310—in particular, a width W being greater than the depth D—is selected to allow sensor device 310 to be inserted under the skin of the patient using a minimally invasive procedure and to remain in the desired orientation during insertion. For example, the device shown in FIG. 7A includes radial asymmetries (notably, the rectangular shape) along the longitudinal axis that maintains the device in the proper orientation following insertion. For example, in one example the spacing between proximal electrode 313a and distal electrode 313b may range from 30 millimeters (mm) to 55 mm, 35 mm to 55 mm, and from 40 mm to 55 mm and may be any range or individual spacing from 25 mm to 60 mm. In-some examples, the length L may be from 30 mm to about 70 mm. In other examples, the length L may range from 40 mm to 60 mm, 45 mm to 60 mm and may be any length or range of lengths between about 30 mm and about 70 mm. In addition, the width W of first major surface 18 may range from 3 mm to 10 mm and may be any single or range of widths between 3 mm and 10 mm. The thickness of depth D of sensor device 310 may range from 2 mm to 9 mm. In other examples, the depth D of sensor device 310 may range from 2 mm to 5 mm and may be any single or range of depths from 2 mm to 9 mm. In addition, sensor device 310 according to an example of the present disclosure is has a geometry and size designed for ease of implant and patient comfort. Examples of sensor device 310 described in this disclosure may have a volume of 3 cc or less, 2 cc or less, 1 cc or less, 0.9 cc or less, 0.8 cc or less, 0.7 cc or less, 0.6 cc or less, 0.5 cc or less, or 0.4 cc or less, any volume between 3 and 0.4 cc. In addition, in the example shown in FIG. 7A, proximal end 322 and distal end 324 are rounded to reduce discomfort and irritation to surrounding tissue once inserted under the skin of the patient.

In the example shown in FIG. 7A, once inserted within the patient, the first major surface 318 faces outward, toward the skin of the patient while the second major surface 320 is located opposite the first major surface 318. Consequently, the first and second major surfaces may face in directions along a sagittal axis of patient, and this orientation may be consistently achieved upon implantation due to the dimensions of sensor device 310. Additionally, an accelerometer, or axis of an accelerometer, may be oriented along the sagittal axis.

Proximal electrode 313a and distal electrode 313b are used to sense electrical signals (e.g., EEG signals) which may be submuscular or subcutaneous. Electrical signals may be stored in a memory of the sensor device 310, and signal data may be transmitted via integrated antenna 326 to another medical device, which may be another implantable device or an external device, such as external device 150 (FIG. 5). In some examples, electrodes 313a and 313b may additionally or alternatively be used for sensing any biopotential signal of interest, such as an electrocardiogram (ECG), intracardiac electrogram (EGM), electromyogram (EMG), or a nerve signal, from any implanted location.

In the example shown in FIG. 7A, proximal electrode 313a is in close proximity to the proximal end 322, and distal electrode 313b is in close proximity to distal end 324. In this example, distal electrode 313b is not limited to a flattened, outward facing surface, but may extend from first major surface 318 around rounded edges 328 or end surface 330 and onto the second major surface 320 so that the electrode 313b has a three-dimensional curved configuration. In the example shown in FIG. 7A, proximal electrode 313a is located on first major surface 318 and is substantially flat, outward facing. However, in other examples proximal electrode 313a may utilize the three-dimensional curved configuration of distal electrode 313b, providing a three-dimensional proximal electrode (not shown in this example). Similarly, in other examples distal electrode 313b may utilize a substantially flat, outward facing electrode located on first major surface 18 similar to that shown with respect to proximal electrode 313a. The various electrode configurations allow for configurations in which proximal electrode 313a and distal electrode 313b are located on both first major surface 18 and second major surface 320. In other configurations, such as that shown in FIG. 7A, only one of proximal electrode 313a and distal electrode 313b is located on both major surfaces 318 and 320, and in still other configurations both proximal electrode 313a and distal electrode 313b are located on one of the first major surface 318 or the second major surface 320 (e.g., proximal electrode 313a located on first major surface 318 while distal electrode 313b is located on second major surface 320). In another example, sensor device 310 may include electrodes 313 on both first major surface 318 and second major surface 320 at or near the proximal and distal ends of the device, such that a total of four electrodes 313 are included on sensor device 310. Electrodes 313 may be formed of a plurality of different types of biocompatible conductive material (e.g., stainless steel, titanium, platinum, iridium, or alloys thereof), and may utilize one or more coatings such as titanium nitride or fractal titanium nitride. Although the example shown in FIG. 7A includes two electrodes 313, in some embodiments the sensor device 310 can include 3, 4, 5, or more electrodes carried by the housing 314 or by an electrode extension(s). For example, FIG. 7B illustrates an example sensor device 310 including dual electrode extensions 351A, 351B and FIG. 7C illustrates an example sensor device including a single electrode extension 352.

In the example shown in FIG. 7A, proximal end 322 includes a header assembly 332 that includes one or more of proximal electrode 313a, integrated antenna 326, anti-migration projections 334, or suture hole 336. Integrated antenna 326 is located on the same major surface (i.e., first major surface 318) as proximal electrode 313a and is also included as part of header assembly 332. Integrated antenna 326 allows sensor device 310 to transmit or receive data. In other examples, integrated antenna 326 may be formed on the opposite major surface as proximal electrode 313a, or may be incorporated within the housing 314 of sensor device 310. In the example shown in FIG. 7A, anti-migration projections 334 are located adjacent to integrated antenna 326 and protrude away from first major surface 318 to prevent longitudinal movement of the device. In the example shown in FIG. 7A anti-migration projections 334 includes a plurality (e.g., six or nine) small bumps or protrusions extending away from first major surface 318. As discussed above, in other examples anti-migration projections 334 may be located on the opposite major surface as proximal electrode 313a or integrated antenna 326. In addition, in the example shown in FIG. 4 header assembly 332 includes suture hole 336, which provides another means of securing sensor device 310 to the patient to prevent movement following insert. In the example shown, suture hole 336 is located adjacent to proximal electrode 313a. In one example, header assembly 332 is a molded header assembly made from a polymeric or plastic material, which may be integrated or separable from the main portion of sensor device 310.

Figure 8:
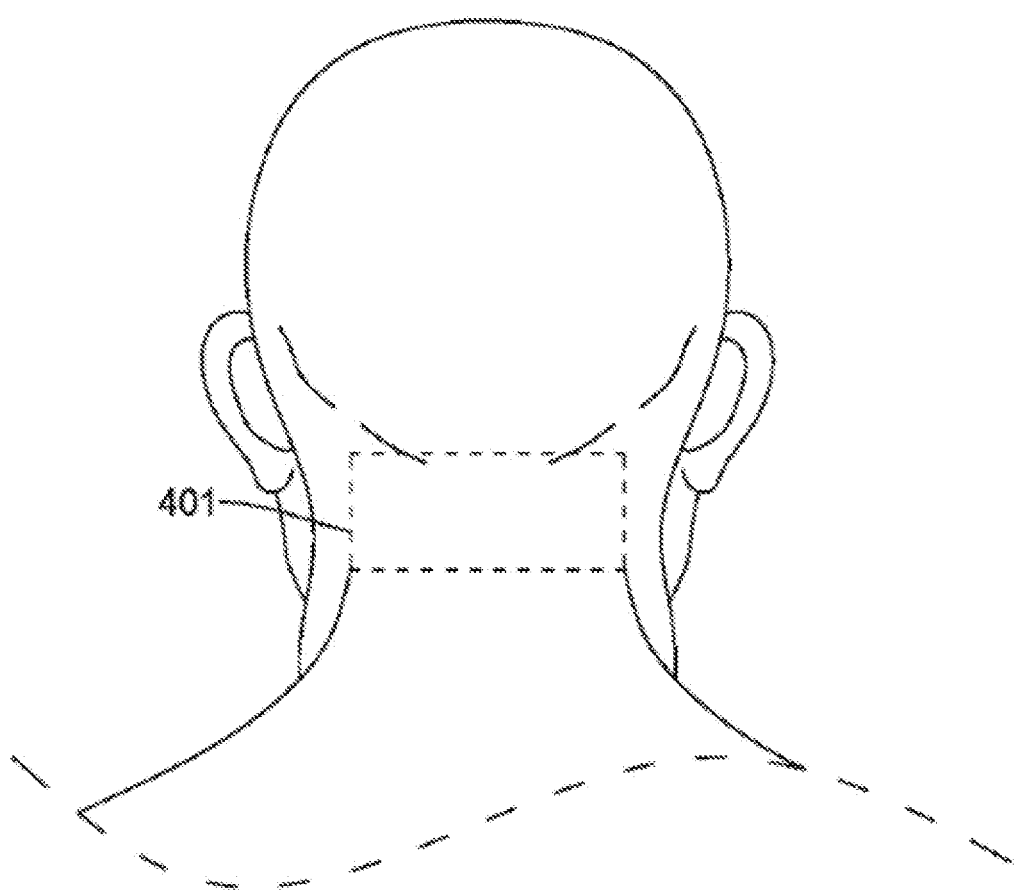
FIG. 8 depicts an example target region for the sensor devices in accordance with one or more techniques of the present disclosure.
Figure 9:
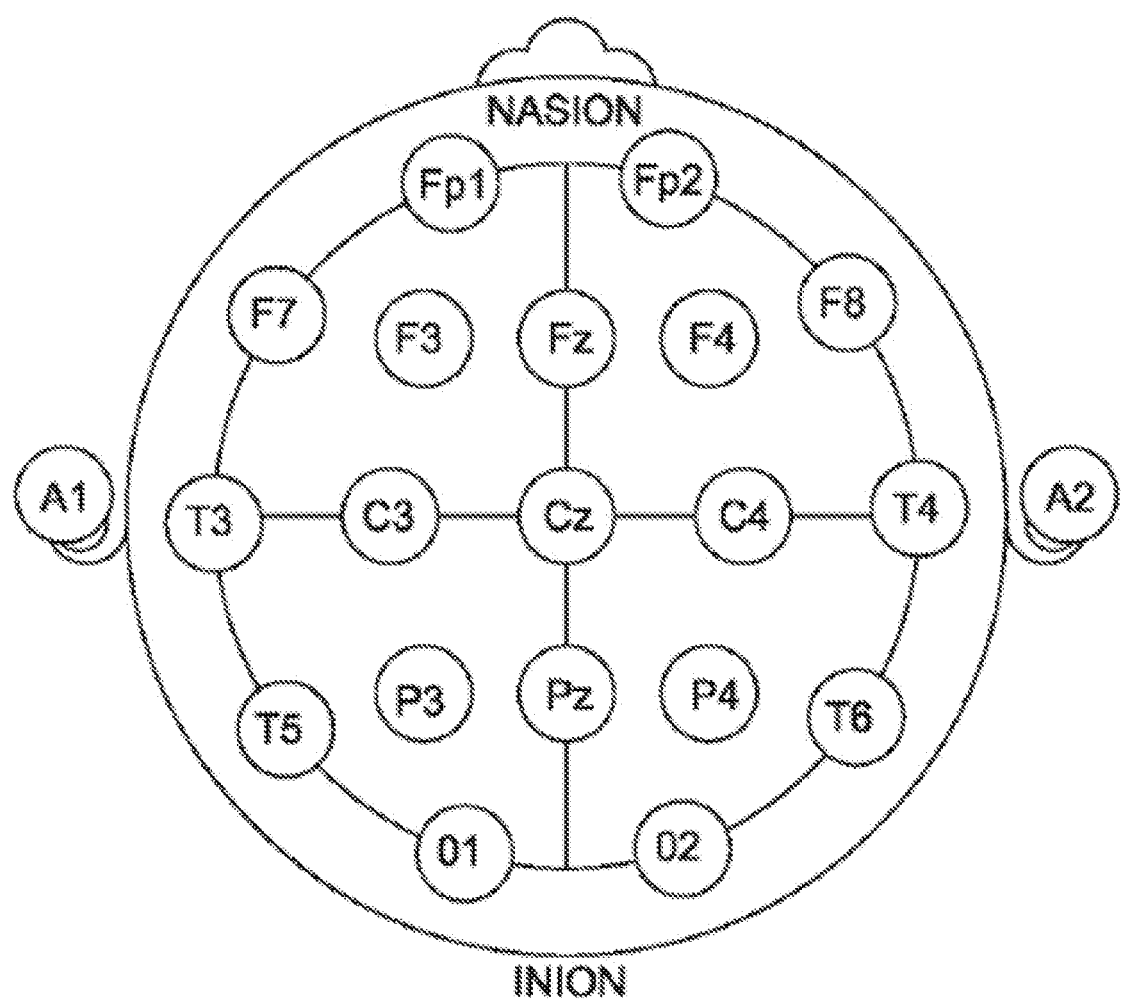
FIG. 9 is a diagram of an example map for electroencephalography (EEG) sensor measurements.

FIG. 8 illustrates an exemplary target region 401 for positioning a sensor device (e.g., sensor devices 110, 210, 310 described elsewhere herein). As illustrated, the target region 401 can be a rear portion of a user's neck or at the base of the skull. The target region 401 can be positioned above the patient's shoulders and at or below the patient's occipital bone. As noted previously, a sensor device can be disposed in this region either via implantation (e.g., subcutaneously) or by being placed over the patient's skin with one or more electrodes of a sensor device being in direct contact with the patient's skin at or adjacent the target region 401.

While conventional EEG electrodes are placed over the patient's scalp, the present technology advantageously enables recording of clinically useful brain activity data via electrodes positioned at the target region 401 at the rear of the patient's neck. This anatomical area is well suited to suited both to implantation of a sensor device and to temporary placement of a sensor device over the patient's skin. In contrast, EEG electrodes positioned over the scalp are cumbersome, and implantation over the patient's skull is challenging and may introduce significant patient discomfort. As noted elsewhere here, conventional EEG electrodes are typically positioned over the scalp to more readily achieve a suitable signal-to-noise ratio for detection of brain activity. However, by using certain digital signal processing, and a special-purpose classifier algorithm, clinically useful brain activity data can be obtained using sensors disposed at the target region 401. Specifically, the electrodes can detect electrical activity that corresponds to brain activity in the P3, Pz, and/or P4 regions (see FIG. 9).

Figure 10:
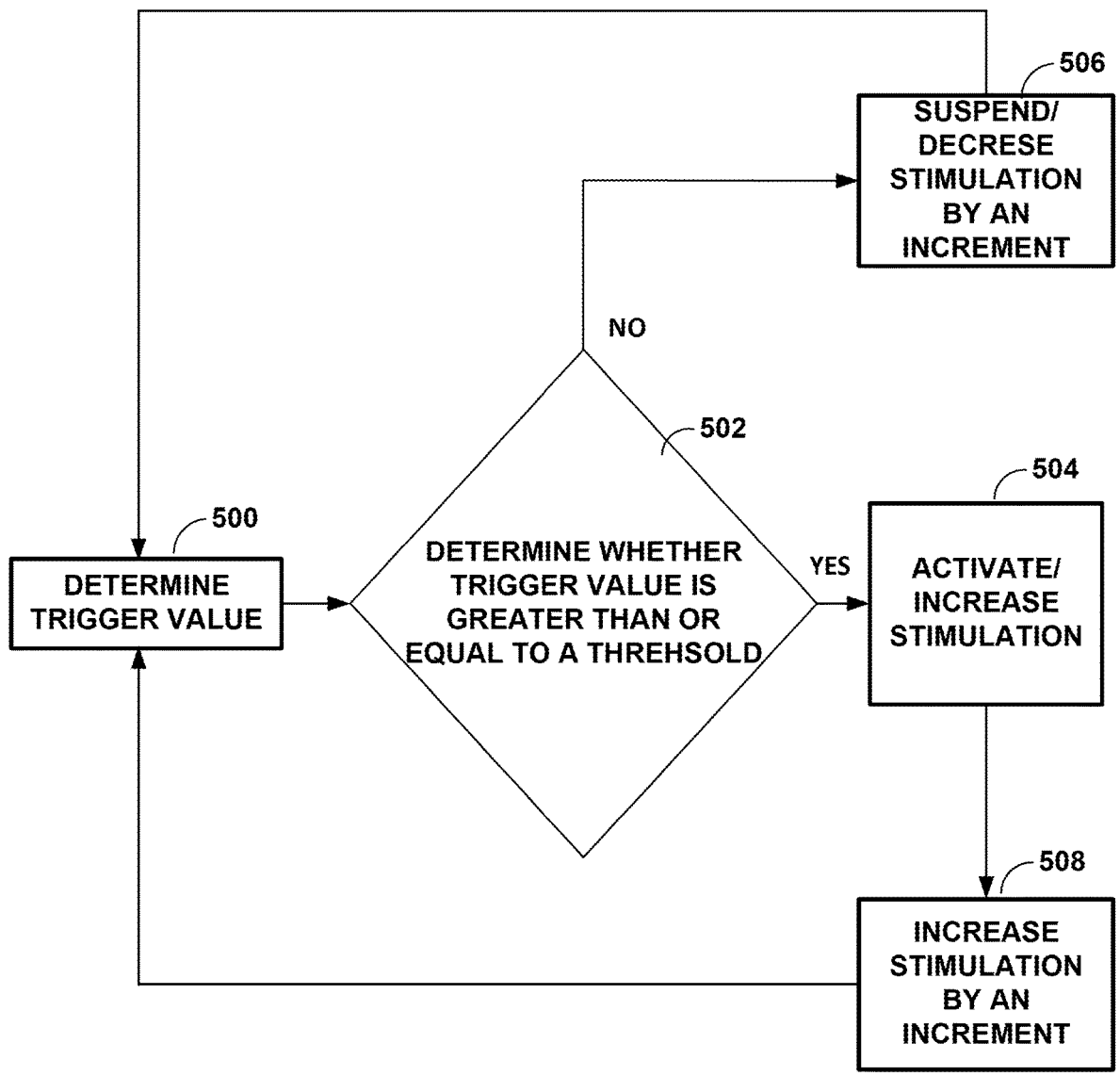
FIG. 10 is a flow diagram illustrating example techniques that may be performed by a one or more of a system or device, in accordance with one or more techniques disclosed herein.

FIG. 10 is a flow diagram illustrating example techniques according to the present disclosure. Circuitry of IMD 28 may determine a trigger value (500). Some examples of trigger values may be cardiac ischemia score of patient 14, stroke/TBI score of patient 14, stroke/TBI recovery score of patient 14, laryngeal activity, change in heart rate, and inflammatory cytokine levels of patient 14. Some examples of trigger values may be a brain ischemia score of patient 14. Cardiac ischemia score may be determined based on ECG related measurements detected by IMD 28, sensor device 110, 210, and/or a separate implantable cardiac monitor (ICM) communicatively coupled to IMD 28. Some examples of ECG related measurements include ST elevation to be triggered after a myocardial infarct, QT corrected for heart rate and T-wave, the short term variability of the QT interval compared to previous beats, heart rate variability in time or frequency domain, heart rate recovery, and deceleration capacity. In some examples, pulmonary arterial pressure and/or pressure near organ site may also influence a cardiac ischemia score.

Stroke/TBI score may be determined based on one or more of EMG changes, impedance, or intracranial pressure detected by sensor device 110, 210. Stroke/TBI recovery score may be determined based on one or more of EEG, ECG, accelerometer, impedance levels determined by sensor device 110, 210, or one or more XR parameters. IMD 28, sensor device 110, 210, or another implantable medical device may detect an inflammatory cytokine level of patient 14.

In some examples, a trigger value may be creatinine values indicative of acute kidney injury and/or inflammation makers (Il-6, TNF-alfa), or bowl activity as assessed by activity, impedance detected by IMD 28, sensor device 110, 210, and/or a separate ICM, or sound sensed from the stomach or intestines.

Circuitry of IMD 28 may then determine whether the trigger value is greater than or equal to a respective threshold (502). For example, the determined cardiac ischemia score is compared to a cardiac ischemia score threshold, a stroke/TBI score is compared to a stroke/TBI score threshold, and so on. In some examples, in response to the circuitry of IMD 28 determining the trigger value is greater than or equal to a respective threshold, circuitry may activate and/or increase bilateral vagus nerve stimulation (504). In some examples, circuitry of IMD 28 may increase bilateral vagus nerve stimulation based on the determined trigger value. In some examples, circuitry of IMD 28 may increase stimulation by an incremental amount (508), such as a predetermined incremental amount. For example, if the trigger value is greater than or equal to the threshold, circuitry of IMD 28 may increase stimulation power on a stepped basis. Then circuitry of IMD 28 may determine again whether the trigger value is greater than or equal to a threshold. If it is, circuitry of IMD 28 may increase stimulation power by another incremental amount.

In response to determining the trigger value is less than the threshold, circuitry of IMD 28 may suspend or decrease bilateral vagus nerve stimulation (506). For example, if the trigger value is less than the threshold and circuitry of IMD 28 may decrease stimulation power on a stepped basis. Then circuitry of IMD 28 may determine again whether the trigger value is less than a threshold. If it is, circuitry of IMD 28 may decrease stimulation power by another incremental amount. In some examples, circuitry of IMD 28 may suspend bilateral vagus nerve stimulation based on the determined trigger value.

The techniques of this disclosure may facilitate the bilateral stimulation of the vagus nerves in a manner that may provide less frequent stimulation of any single vagus nerve, which may reduce refractory response due to nerve fatigue. In addition, leads being configured for endovascular and/or percutaneous lead placement may also allow temporary trialing patients to test therapy responsiveness. In addition, closed-loop feedback techniques in a bilateral neurostimulation system or device may provide quicker, more efficient, and more responsive results than an open-loop technique.

It should be noted that the techniques described herein, may not be limited to treatment or monitoring of a human patient. In alternative examples, the techniques of this disclosure may be applied to non-human patients, e.g., primates, canines, equines, pigs, and felines. These other animals may undergo clinical or research therapies that my benefit from the subject matter of this disclosure.

Various examples are discussed relative to one or more stimulation devices. It is recognized that the stimulation devices may include features and functionality in addition to electrical stimulation. Many of these additional features are expressly discussed herein. A few example features include, but are not limited to, different types of sensing capabilities and different types of wireless communication capabilities. For ease of discussion, the present disclosure does not expressly recite every conceivable combination of the additional features, such as by repeating every feature each time different examples and uses of the stimulation devices are discussed.

The techniques of this disclosure may be implemented in a wide variety of computing devices, medical devices, or any combination thereof. Any of the described units, circuitry or components may be implemented together or separately as discrete but interoperable logic devices. Depiction of different features as circuitry or units is intended to highlight different functional aspects and does not necessarily imply that such circuitry or units must be realized by separate hardware or software components. Rather, functionality associated with one or more circuitry or units may be performed by separate hardware or software components, or integrated within common or separate hardware or software components.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory that is tangible. The computer-readable storage media may be referred to as non-transitory. A server, client computing device, or any other computing device may also contain a more portable removable memory type to enable easy data transfer or offline data analysis.

The techniques described in this disclosure, including those attributed to various circuitry and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated, discrete logic circuitry, or other processing circuitry, as well as any combinations of such components, remote servers, remote client devices, or other devices. The term "processing circuitry" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, circuitry or components may be implemented together or separately as discrete but interoperable logic devices. Depiction of different features as circuitry or units is intended to highlight different functional aspects and does not necessarily imply that such circuitry or units must be realized by separate hardware or software components. Rather, functionality associated with one or more circuitry or units may be performed by separate hardware or software components, or integrated within common or separate hardware or software components. For example, any circuitry described herein may include electrical circuitry configured to perform the features attributed to that particular circuitry, such as fixed function processing circuitry, programmable processing circuitry, or combinations thereof.

In some examples, a computer-readable storage medium comprises non-transitory medium. The term "non-transitory" may indicate that the storage medium is not embodied in a carrier wave or a propagated signal. In certain examples, a non-transitory storage medium may store data that may, over time, change (e.g., in RAM or cache).

This disclosure includes the following non-limiting examples.

Example 1: A system includes a first lead configured to be positioned in or beside a left internal jugular vein (IJV) of a patient to deliver a first stimulation signal to a first vagus nerve on a first side of a neck, the first lead including one or more first segmented electrodes positioned on a distal portion of the first lead and one or more first anchoring mechanisms; a second lead configured to be positioned in or beside a right IJV of the patient to deliver a second stimulation signal to a second vagus nerve on a second side of a neck, the second side being different than the first side, the second lead including one or more second segmented electrodes positioned on a distal portion of the second lead and one or more second anchoring mechanisms; and circuitry configured to be coupled to the first lead and the second lead, the circuitry being configured to deliver electrical energy to the first lead to deliver the first stimulation signal and the second lead to deliver the second stimulation signal to provide bilateral stimulation to the first vagus nerve and the second vagus nerve.

Example 2: The system of example 1, wherein the first and second segmented electrodes include a plurality of electrode segments, and wherein the circuitry is configured to deliver the electrical energy to selected electrode segments to steer current associated with the first and second stimulation signals.

Example 3: The system of any of examples 1 and 2, wherein the one or more first anchoring mechanisms are positioned proximally on the first lead with respect to the one or more first segmented electrodes and the one or more second anchoring mechanisms positioned proximally on the second lead with respect to the one or more second segmented electrodes.

Example 4: The system of any of examples 1 through 3, wherein the circuitry is configured to sense a signal via one or more of the first segmented electrodes and sense a signal via one or more of the second segmented electrodes.

Example 5: The system of example 4, wherein the circuitry is configured to: detect an inflammatory cytokine level of the patient based on the sensed signal; and determine a start of an inflammatory time window that corresponds to an onset of a stroke or traumatic brain injury (TBI) and an end of the inflammatory time window based on the detected inflammatory cytokine level.

Example 6: The system of example 5, wherein the circuitry is configured to deliver the electrical energy to at least one of the first lead or the second lead during the inflammatory time window in response to determining the start of the inflammatory time window.

Example 7: The system of example 6, wherein the circuitry is further configured to deliver the electrical energy alternatively to the first lead and the second lead during the inflammatory time window.

Example 8: The system of any of examples 1 through 7, further including one or more accelerometers configured to detect motion of a laryngeal muscle of the patient, the one or more accelerometers being configured to be coupled to the circuitry, wherein the circuitry is further configured to determine laryngeal activity of the patient based on the detected motion of the laryngeal muscle.

Example 9: The system of example 8, wherein the circuitry is configured to adjust delivery of the electrical energy to at least one of the first lead and the second lead based on the determined laryngeal activity of the patient.

Example 10: The system of any of examples 1 through 9, further includes determine a trigger value of the patient based on the detected physiological parameter data, and adjust delivery of the electrical energy to at least one of the first lead and the second lead based on the determined trigger value.

Example 11: The system of example 10, wherein the circuitry is further configured to adjust delivery of the electrical energy to at least one of the first lead and the second lead based on the determined trigger value being greater than or equal to a trigger value threshold.

Example 12: The system of any of examples 10 and 11, wherein the trigger value is one or more of a stroke/traumatic brain injury (TBI) recovery score, a stroke/TBI score, a cardiac ischemia score, brain ischemia score, or an inflammatory cytokine level of the patient based on detected parameter data of the patient.

Example 13: The system of any of examples 10 through 12, wherein the detected physiological parameter data includes one or more of an electroencephalography (EEG), an electrocardiogram (ECG), accelerometry data, impedance data, or compound action potential data.

Example 14: The system of any of examples 1 through 13, wherein the circuitry is configured to selectively deliver electrical energy to the first lead and the second lead at different respective times to provide bilateral stimulation to the first vagus nerve and the second vagus nerve.

Example 15: An implantable medical device includes stimulation circuitry configured to be coupled to a first lead and a second lead and configured to deliver first stimulation signals to a first vagus nerve on a first side of a neck via the first lead and deliver second stimulation signals to a second vagus nerve on a second side of the neck via the second lead; telemetry circuitry configured to be coupled to a sensor device and configured to receive physiological parameter data from the sensor device; and processing circuitry configured to cause the stimulation circuitry to adjust delivery of the first stimulation signals and the second stimulation signals based on the received physiological parameter data.

Example 16: The implantable medical device of example 15, wherein the processing circuitry is further configured to: determine a trigger value of the patient based on the detected physiological parameter data; and cause the stimulation circuitry to adjust delivery of the first stimulation signals and the second stimulation signals based on the determined trigger value being greater than or equal to a trigger value threshold.

Example 17: The implantable medical device of example 16, wherein the trigger value is one or more of a stroke/traumatic brain injury (TBI) recovery score, a stroke/TBI score, a cardiac ischemia score, a brain ischemia score, or an inflammatory cytokine level of the patient based on detected parameter data of the patient.

Example 18: The implantable medical device of any of examples 15 through 17, wherein the detected physiological parameter data includes one or more of an electroencephalography (EEG), an electrocardiogram (ECG), accelerometry data, impedance data, or compound action potential data.

Example 19: The implantable medical device of any of examples 15 through 18, wherein the processing circuitry is further configured to cause the stimulation circuitry to deliver the first stimulation signals and the second stimulation signals alternatively.

Example 20: The implantable medical device of any of examples 15 through 19, wherein the processing circuitry is further configured to: determine an inflammatory time window of the patient based on the received physiological parameter data; and cause the stimulation circuitry to deliver the first stimulation signals and the second stimulation signals during the inflammatory time window.

Various examples have been described herein. Any combination of the described operations or functions is contemplated. These and other examples are within the scope of the following claims. Based upon the above discussion and illustrations, it is recognized that various modifications and changes may be made to the disclosed examples in a manner that does not require strictly adherence to the examples and applications illustrated and described herein. Such modifications do not depart from the true spirit and scope of various aspects of the disclosure, including aspects set forth in the claims.

What is claimed is:

1. A system comprising:
   a first lead configured to be positioned in or beside a left internal jugular vein (IJV) of a patient to deliver a first stimulation signal to a first vagus nerve on a first side of a neck, the first lead including one or more first segmented electrodes positioned on a distal portion of the first lead and one or more first anchoring mechanisms;
   a second lead configured to be positioned in or beside a right IJV of the patient to deliver a second stimulation signal to a second vagus nerve on a second side of a neck, the second side being different than the first side, the second lead including one or more second segmented electrodes positioned on a distal portion of the second lead and one or more second anchoring mechanisms; and
   circuitry configured to be coupled to the first lead and the second lead, the circuitry being configured to deliver electrical energy to the first lead to deliver the first stimulation signal and the second lead to deliver the second stimulation signal to provide bilateral stimulation to the first vagus nerve and the second vagus nerve,
   wherein the circuitry is further configured to:
      sense at least one of a first signal via one or more of the first segmented electrodes and a second signal via one or more of the second segmented electrodes,
      detect an inflammatory cytokine level of the patient based on at least one of the first sensed signal or the second sensed signal,
      determine a start of an inflammatory time window that corresponds to an onset of a stroke or traumatic brain injury (TBI), and an end of the inflammatory time window based on the detected inflammatory cytokine level, and
      deliver the electrical energy to at least one of the first lead or the second lead during the inflammatory time window in response to determining the start of the inflammatory time window.

2. The system of claim 1, wherein the first and second segmented electrodes include a plurality of electrode segments, and wherein the circuitry is configured to deliver the electrical energy to selected electrode segments to steer current associated with the first and second stimulation signals.

3. The system of claim 1, wherein the one or more first anchoring mechanisms are positioned proximally on the first lead with respect to the one or more first segmented electrodes and the one or more second anchoring mechanisms positioned proximally on the second lead with respect to the one or more second segmented electrodes.

4. The system of claim 1, wherein the circuitry is further configured to deliver the electrical energy alternatively to the first lead and the second lead during the inflammatory time window.

5. A system of comprising:
   a first lead configured to be positioned in or beside a left internal jugular vein (IJV) of a patient to deliver a first stimulation signal to a first vagus nerve on a first side of a neck, the first lead including one or more first segmented electrodes positioned on a distal portion of the first lead and one or more first anchoring mechanisms;
   a second lead configured to be positioned in or beside a right IJV of the patient to deliver a second stimulation signal to a second vagus nerve on a second side of a neck, the second side being different than the first side, the second lead including one or more second segmented electrodes positioned on a distal portion of the second lead and one or more second anchoring mechanisms;
   circuitry configured to be coupled to the first lead and the second lead, the circuitry being configured to deliver electrical energy to the first lead to deliver the first stimulation signal and the second lead to deliver the second stimulation signal to provide bilateral stimulation to the first vagus nerve and the second vagus nerve; and
   one or more accelerometers configured to detect motion of a laryngeal muscle of the patient, the one or more accelerometers being configured to be coupled to the circuitry;
   wherein the circuitry is further configured to:
      sense at least one of a first signal via one or more of the first segmented electrodes and a second signal via one or more of the second segmented electrodes,
      detect an inflammatory cytokine level of the patient based on at least one of the first sensed signal or the second sensed signal,
      determine a start of an inflammatory time window that corresponds to an onset of a stroke or traumatic brain injury (TBI), and an end of the inflammatory time window based on the detected inflammatory cytokine level,
      determine laryngeal activity of the patient based on the detected motion of the laryngeal muscle, and
      adjust delivery of the electrical energy to at least one of the first lead and the second lead based on the determined laryngeal activity of the patient.

6. An implantable medical device comprising:
   stimulation circuitry configured to be coupled to a first lead and a second lead and configured to deliver first stimulation signals to a first vagus nerve on a first side of a neck via the first lead and deliver second stimulation signals to a second vagus nerve on a second side of the neck via the second lead;

telemetry circuitry configured to be coupled to a sensor device and configured to receive physiological parameter data from the sensor device, the sensor device configured to be implanted above shoulders of a patient; and processing circuitry configured to:
    determine an inflammatory cytokine level of the patient based on the received physiological parameter data;
    determine a start of an inflammatory time window that corresponds to an onset of a stroke or traumatic brain injury (TBI), and an end of the inflammatory time window based on the determined inflammatory cytokine level; and
    cause the stimulation circuitry to deliver the first stimulation signals and the second stimulation signals during the inflammatory time window.

7. The implantable medical device of claim 6, wherein the processing circuitry is further configured to:
    determine a trigger value of the patient based on the detected physiological parameter data; and
    cause the stimulation circuitry to adjust delivery of the first stimulation signals and the second stimulation signals based on the determined trigger value being greater than or equal to a trigger value threshold.

8. The implantable medical device of claim 7, wherein the trigger value is one or more of a stroke/TBI recovery score, a stroke/TBI score, a cardiac ischemia score, or brain ischemia score of the patient based on detected parameter data of the patient.

9. The implantable medical device of claim 6, wherein the detected physiological parameter data includes one or more of an electroencephalography (EEG), an electrocardiogram (ECG), accelerometry data, impedance data, or compound action potential data.

10. The implantable medical device of claim 6, wherein the processing circuitry is further configured to cause the stimulation circuitry to deliver the first stimulation signals and the second stimulation signals alternatively.

\* \* \* \* \*